(12) United States Patent
Brebner

(10) Patent No.: US 7,379,451 B1
(45) Date of Patent: May 27, 2008

(54) ADDRESS LOOKUP TABLE

(75) Inventor: Gordon J. Brebner, Monte Sereno, CA (US)

(73) Assignee: Xilinx, Inc., San Jose, CA (US)

( * ) Notice: Subject to any disclaimer, the term of this patent is extended or adjusted under 35 U.S.C. 154(b) by 1046 days.

(21) Appl. No.: 10/421,013

(22) Filed: Apr. 21, 2003

(51) Int. Cl.
*H04L 12/66* (2006.01)
*H04L 12/28* (2006.01)

(52) U.S. Cl. .................. 370/356; 370/389; 370/392; 370/400

(58) Field of Classification Search ............. None
See application file for complete search history.

(56) References Cited

U.S. PATENT DOCUMENTS

| | | | |
|---|---|---|---|
| 6,023,563 A * | 2/2000 | Shani | 709/249 |
| 6,275,491 B1 | 8/2001 | Prasad et al. | |
| 6,279,045 B1 | 8/2001 | Muthujumaraswathy et al. | |
| 6,430,188 B1 * | 8/2002 | Kadambi et al. | 370/398 |
| 6,633,865 B1 | 10/2003 | Liao | |
| 6,661,794 B1 | 12/2003 | Wolrich et al. | |
| 6,891,397 B1 | 5/2005 | Brebner | |
| 7,006,526 B1 | 2/2006 | Biederman | |
| 7,116,681 B1 | 10/2006 | Hovell et al. | |
| 2002/0021703 A1 | 2/2002 | Tsuchiya et al. | |
| 2002/0159461 A1 | 10/2002 | Hamamoto et al. | |
| 2003/0026211 A1 | 2/2003 | Xu et al. | |
| 2003/0108038 A1 | 6/2003 | Devanagondi et al. | |
| 2004/0001488 A1 | 1/2004 | Harri | |
| 2004/0264465 A1 | 12/2004 | Dunk | |
| 2005/0243818 A1 * | 11/2005 | Foglar et al. | 370/389 |
| 2006/0114908 A1 * | 6/2006 | Kalkunte et al. | 370/392 |

OTHER PUBLICATIONS

U.S. Appl. No. 10/420,603, filed Apr. 21, 2003, Brebner.
U.S. Appl. No. 10/420,652, filed Apr. 21, 2003, Brebner.
Brebner, Gordon; "Mixed-Version IP Router (MIR)", XAPP655 (v1.2), Oct. 13, 2004, pp. 1-18, available from Xilinx, Inc., 2100 Logic Drive, San Jose, CA 95124.
http://www-cad.eecs.berkeley.edu/Respep/Research/hsc/; downloaded Apr. 18, 2003; pp. 1-6.
N. Bergmann et al.; "Reconfigurable Computing and Reactive Systems"; Proceedings of the 7th Australasian Conference on Parallel and Real-Time Systems; Springer; Nov. 29-30, 2000; pp. 171-180.
F. Braun et al.; "Reconfigurable Router Modules Using Network Protocol Wrappers"; 11th International Conference on Field Programmable Logic and Applications; Springer LNCS 2147; Aug. 27-29, 2001; pp. 254-263.
G. Brebner; "A Virtual Hardware Operating System for the Xilinx XC6200"; 6th International Workshop on Field Programmable Logic and Applications; Springer LNCS 1142; Sep. 23-25, 1996; pp. 327-336.

(Continued)

*Primary Examiner*—Melanie Jagannathan
(74) *Attorney, Agent, or Firm*—W. Eric Webostad

(57) ABSTRACT

Apparatus and method for an address lookup table is described. The address lookup table for a packet includes: an Internet Protocol field, a router port field, a router port interface field, and a Media Access Control (MAC) address field. Where the Internet Protocol field, the router port field, the router port interface field and the MAC address field have a total bit length less than or equal to sixty-four bits.

5 Claims, 16 Drawing Sheets

OTHER PUBLICATIONS

G. Brebner et al.; "Chip-Based Reconfigurable Task Management"; 11th International Conference on Field Programmable Logic and Applications; Springer LNCS 2147; Aug. 27-29, 2001; pp. 182-191.

G. Brebner; "Single-Chip Gigabit Mixed-Version IP Router on Virtex-II Pro"; IEEE Symposium FPGAs Custom Computing Machines; IEEE Computer Society Press; Apr. 22-24, 2002; pp. 35-44.

J. Burns et al.; "A Dynamic Reconfiguration Run-Time System"; Proc. 5th Annual IEEE Symposium on FPGAs Custom Computing Machines, IEEE; Apr. 16-18, 1997; pp. 66-75.

O. Diessel et al.; "Run-Time Compaction of FPGA Designs"; 7th International Workshop on Field Programmable Logic and Applications; Springer LNCS 1304; Sep. 1-3, 1997; pp. 131-140.

H. ElGindy et al.; "Task Rearrangement on Partially Reconfigurable FPGAs with Restricted Buffer"; 10th International Workshop on Field Programmable Logic and Applications; Springer LNCS 1896; Aug. 27-28, 2000; pp. 379-388.

H. Fallside et al.; "Internet Connected FPL"; 10th International Workshop on Field Programmable Logic and Applications; Springer LNCS 1896; Aug. 27-30, 2000; pp. 48-57.

D. Harel; "Statecharts: A Visual Formalism for Complex Systems"; Science of Computer Programming;8; Jun. 1987; pp. 231-274; downloaded from: http://www.wisdom.weizmann.ac.iL/~dharel/SCANNED.PAPERS/Statecharts.pdf.

A. Silberschattz et al.; "Applied Operating System Concepts"; 1st Edition; New York; published by John Wiley & Sons; Copyright 2000; Chapter 5: Threads; pp. 116-117.

G. Brebner; "Multithreading for Logic-Centric Systems"; 12th International Conference on Field Programmable Logic and Applications; Montepellier, France; Sep. 2-4, 2002; Springer LNCS 2438; pp. 5-14.

R. Gilligan et al.; Internet Requests for Comments (RFC); RFC 2893 "Transition Mechanisms for IPv6 Hosts and Routers"; Aug. 2000; Accessible at http://www.rfc-editor.org/rfc.html.

A. Conta; Internet Requests for Comments (RFC); RFC 2473 "Generic Packet Tunneling in IPv6 Specification"; Dec. 19981 Accessible at http://www.rfc-editor.org/rfc.html.

G. Tsirtsis; Internet Requests for Comments (RFC); RFC 2766 "Network Address Translation—Protocol Translation (NAT-PT)"; Feb. 2000; Accessible at http://www.rfc-editor.org/rfc.html.

E. Nordmark; Internet Requests for Comments (RFC); RFC 2765 "Stateless IP/ICMP Translation Algorithm (SIIT)"; Feb. 2000; Accessible at http://www.rfc-editor.org/rfc.html.

R. Hinden et al.; Internet Requests for Comments (RFC); RFC 2374 "An Aggregatable Global Unicast Address Format"; Jul. 1998; Accessible at http://www.rfc-editor.org/rfc.html.

G. Brebner; "Highly Reconfigurable Communication Protocol Multiplexing Element for SCOPH"; Reconfigurable Technology, Proceedings of SPIE, 4525; Aug. 21-22, 2001; pp. 99-106.

J. Lockwood et al.; "Reprogrammable Network Packet Processing on the Field Programmable Extender (FPX)"; 9th International Symposium on Field Programmable Gate Arrays; ACM Press 2001; pp. 87-93.

J. Ditmar et al.; "A Dynamically Reconfigurable FPGA-Based Content Addressable Memory for Internet Protocol Characterization"; Proc. 10th International Conference on Field Programmable Logic and Applications; Springer LNCS 1896; Aug. 27-30, 2000; pp. 19-28.

S. Guccione et al.; "A Reconfigurable Content Addressable Memory"; Parallel and Distributed Processing; 15 IPDPS 2000 Workshop; Springer LNCS 1800; May 1-5, 2000; pp. 882-889.

G. Brebner et al.; "Runtime Reconfigurable Routing"; Proc. 12th International Parallel Processing Symposium and 9th Symposium Parallel and Distributed Process; Springer LNCS 1388; Mar. 30-Apr. 3, 1998; pp. 25-30.

D. Comer; Chapter 22 The Future IP (IPv6) of *Computer Networks and Internets*; (3rd Edition); Prentice-Hall; 2001; pp. 338-349.

A. Dollas et al.; "Architecture and Applications of PLATO: . . . "; Proc. 9th IEEE Symposium on Field Programmable Custom Computing Machines; IEEE Press; Apr. 30-May 2, 2001; pp. [Preliminary Proceeding].

http://www.npforum.org.

http://www.6bone.net.

http://www.xilinx.com/products/platform/.

http://www.whnet.com/giga.html.

http://www.chips.ibm.com/products/coreconnect/.

* cited by examiner

ADDRESS LOOKUP TABLE

FIELD OF THE INVENTION

One or more aspects of the invention relate generally to an address lookup table and, more particularly, to a compact address lookup table for routing a packet.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device is called a field programmable gate array (FPGA).

An FPGA conventionally includes an array of configurable logic blocks (CLBs) surrounded by a ring of programmable input/output blocks (IOBs). The CLBs and IOBs are interconnected by a programmable interconnect structure. The CLBs, IOBs, and interconnect structure are conventionally programmed by loading a stream of configuration data (bit stream) into internal configuration memory cells that define how the CLBs, IOBs, and interconnect structure are configured. Additionally, an FPGA may include: embedded memory, such as block random access memories (BRAMs); one or more microprocessors, sometimes referred to as embedded cores; digital clock managers (DCMs); and low voltage differential signaling (LVDS) input/output (I/O) interfaces.

The combination of components on an FPGA may be used for system-level integration, sometimes referred to as "system-on-a-chip" (SoC). Accordingly, system-level integration with FPGAs is desirable for flexibility and efficiency.

SUMMARY OF THE INVENTION

An address lookup table, and a method for populating same, for a packet is described. An aspect of the invention is an address lookup table for a packet. The address lookup table comprises: an Internet Protocol field, a router port field, a router port interface field, and a Media Access Control (MAC) address field. The Internet Protocol field, the router port field, the router port interface field and the MAC address field have a total bit length less than or equal to sixty-four bits.

Another aspect of the invention is a method for forming an address lookup table entry for the packet comprises: obtaining a router port number from the packet, the router port number corresponding to a single network; populating a router port field with the router port number obtained; obtaining, if available, a last eight bits of an Internet Protocol version four address from the packet; populating a router port interface field with the last eight bits of the Internet Protocol version four address obtained, if any; obtaining, if available, a last sixty-four bits of an Internet Protocol version six address from the packet; selecting, when present, a first twenty-four bits and a last twenty-four bits from the last sixty-four bits of the Internet Protocol version six address; populating a MAC field with the first twenty-four bits and the last twenty four bits, if any selected, as a forty-eight bit MAC address; and obtaining Internet Protocol of a next hop of the packet from an Internet Protocol field for routing.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
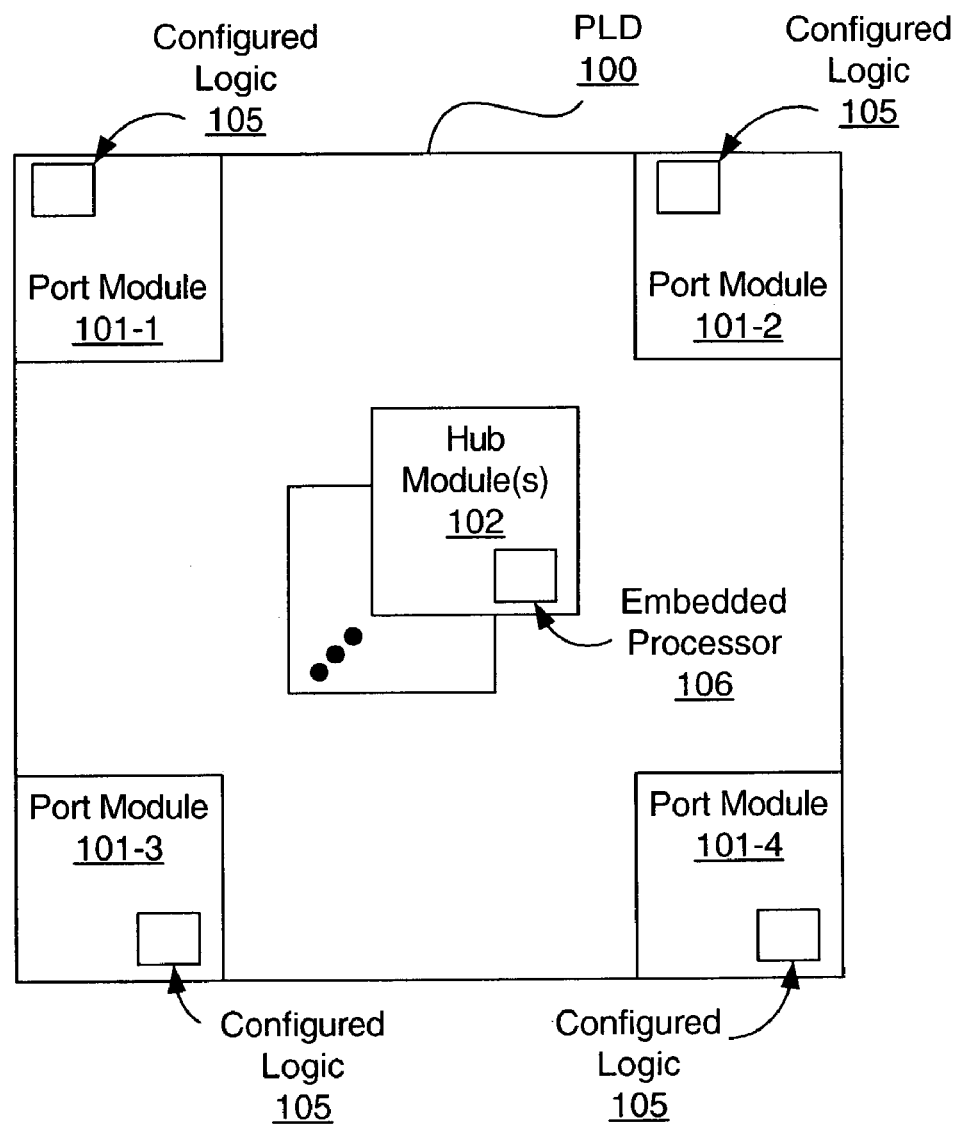
FIG. 1 depicts a high-level block diagram of an exemplary embodiment of a PLD configured as a router.

FIG. 1 depicts a high-level block diagram of an exemplary embodiment of a PLD 100 configured as a router. At the outset, it should be understood that an entire router is provided on a single integrated circuit PLD 100.

PLD 100 includes port modules 101-1, -2, -3 and -4 (collectively referred to as "ports 101"). PLD 100, as shown, includes one or more hub modules 102. For clarity, four discrete regions of PLD 100 are shown having respective ports 101. However, it should be understood that PLD 100 may be configured with fewer or more ports 101. Ports 100 are premised on having configured logic 105, whereas hub modules 102 are premised on an embedded microprocessor core. Notably, such a microprocessor core may include embedded hardware or embedded firmware or a combination thereof for a "hard" or "soft" microprocessor. For clarity, though more than one embedded microprocessor may exist in PLD 100, PLD 100 is described as having a single embedded microprocessor and thus a single hub module ("hub") 102. Though, for purposes of clarity, PLD 100 is described in terms of an FPGA having a single embedded microprocessor, it will be appreciated that other integrated circuits having configurable logic and at least one embedded microprocessor may be used.

PLD 100 is a system-level integration onto a single integrated circuit, namely, an SoC architecture. For this system-level integration, configurable logic 105 of ports 101 may be configured for more frequent, less control intensive operations in contrast to hub 102, which embedded microprocessor 106 is for less frequent, more control intensive operations. Accordingly, a majority of packets may be entirely handled by ports 101 without ever being received to hub 102. In such a logic-centric architecture, computational focus of PLD 100 is placed on configurable logic 105 of ports 101, where an embedded microprocessor of hub 102 serves as an additional, not a central, system component. Alternatively, a more processor-centric architecture may be used. Furthermore, an architecture having a combination of processor-centric and logic-centric components may be used.

Additionally, as described below, communication between ports 101 and one or more devices external to PLD 100 may be tailored to environmental context. Accordingly, ports 101 of PLD 100 may be configured to provide a reactive portion of a system, namely, a system that reacts to inputs obtained over time. This is in contrast to a transformational system conventionally associated with running programs on a processor.

It should be appreciated that each port 101 and each hub 102 is a respective system, or more particularly a subsystem of the system of PLD 100. Furthermore, hub 102 may logically be considered a port as it may have all the functionality of a port, and additionally has functionality beyond that of a port; however, hub 102 does not have a network interface. With respect to functionality of hub 102, any well-known microprocessor capable of processing network communications may be used. For purposes of clarity, gigabit Ethernet and Internet Protocol (IP) digital network communications is described, though analog network communications may be used, as well as other combinations of data rates and communication protocols. Furthermore, though it is assumed that a copper-wired network environment is used, it should be appreciated that other signal formats (e.g., optical, over-the-air ("wireless"), and the like) may be used.

Figure 2A:
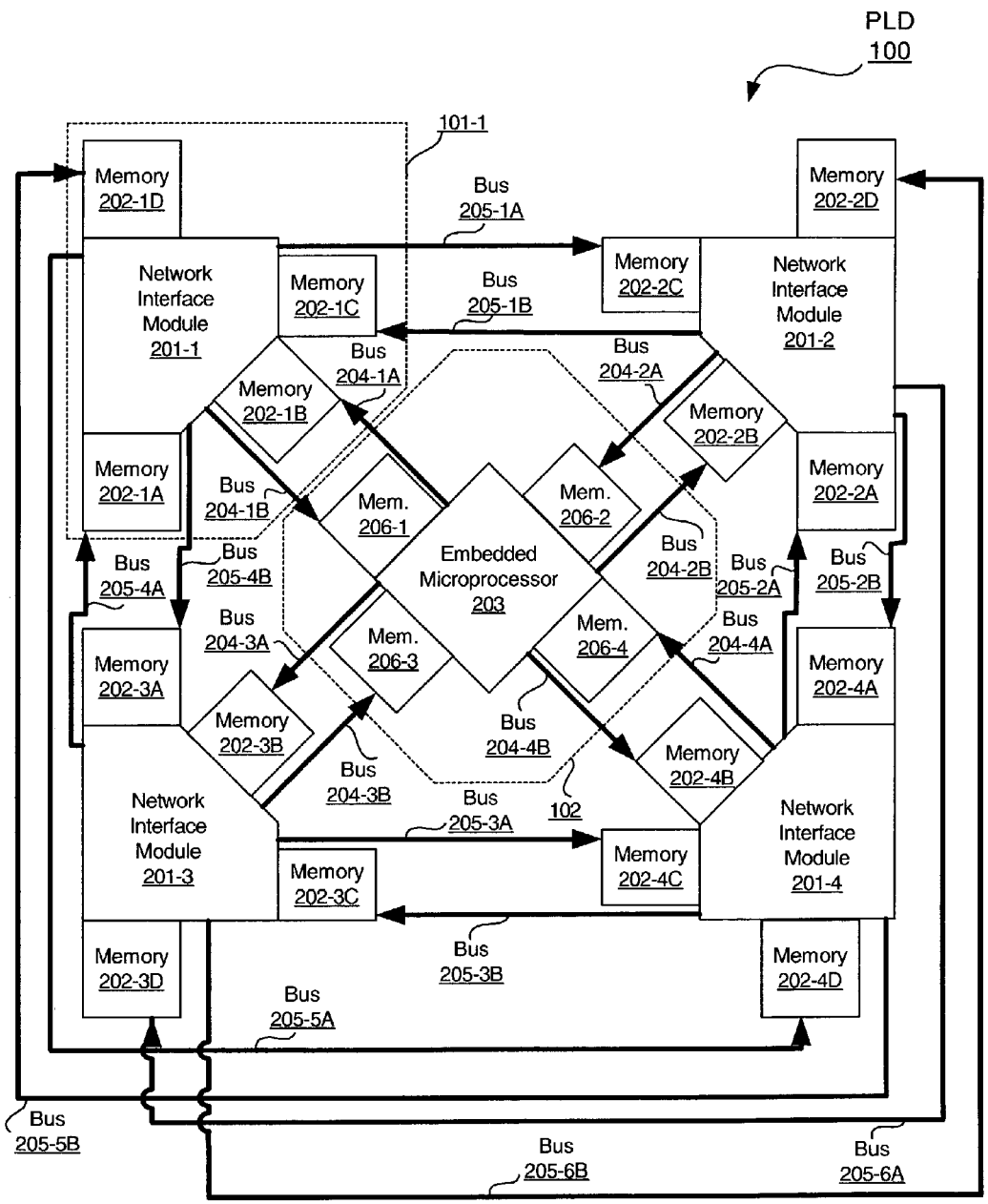
FIG. 2A depicts a block diagram of an exemplary embodiment of a PLD having a unidirectional mesh point-to-point topology.

FIG. 2A is a block diagram of an exemplary embodiment of PLD 100 having a unidirectional mesh point-to-point topology. With continuing reference to FIG. 1, FIG. 2A is described.

Each port 101-1, -2, -3 and -4 includes a respective network interface module 201-1, -2, -3 and -4 (collectively referred to as "network interface modules 201") and memory 202-1, -2, -3 and -4 (collectively referred to as "memory 202"). For purposes of clearly describing the topology of this exemplary embodiment of PLD 100, memory 202-1, -2, -3 and -4 is broken out into four sections labeled A, B, C and D. For example, memory 202-1 includes memory sections 202-1A, -1B, -1C and -1D.

This exemplary embodiment of PLD 100 includes a hub 102, namely, embedded microprocessor 203 and memory 206. Memory 206 associated with embedded microprocessor 203 is broken out into four sections, namely, memory 206-1, -2, -3 and -4.

Connecting ports 101 to one another is done with buses 205, and connecting ports 101 to hub 102 is done with buses 204. Buses 205 are broken out into the point-to-point links of ports as buses 205-1, -2, -3, -4, -5 and -6. Furthermore, buses 205 are unidirectional as illustratively shown. Accordingly, each bus 205 is broken out into a directional component as indicated by reference letters A and B ascribed to each respective bus 205-1, -2, -3, -4, -5 and -6. Thus, for example, port 101-1 sends communications to port 101-2 via bus 205-1A, and port 101-1 receives communications from port 101-2 via bus 205-1B. Memory 202 is disposed for receiving incoming communications. Continuing the above example, memory 202-2C of port 101-2 buffers incoming communications from port 101-1, and memory 202-1C of port 101-1 buffers incoming communications from port 101-2. Notably, for this topology, each port 101 is connected to each other port via respective buses 205. In other words, ports 101 are in point-to-point communication with one another.

Likewise, buses 204 are broken out into the point-to-point links of ports as buses 204-1, -2, -3 and -4. Furthermore, buses 204 are unidirectional as illustratively shown. Accordingly, each bus 204 is broken out into a directional component as indicated by reference letters A and B ascribed to each respective bus 204-1, -2, -3 and -4. Thus, for example, port 101-1 sends communications to hub 102 via bus 204-1B, and port 101-1 receives communications from hub 102 via bus 204-1A. Memory 202 is disposed for receiving incoming communications. Continuing the above example, memory 202-1B of port 101-1 buffers incoming communications from hub 102, and memory 206-1 of hub 102 buffers incoming communications from port 101. Notably, for this topology, each port 101 is directly connected to hub 102 via respective buses 204. In other words, ports 101 and hub 102 are in point-to-point communication with one another.

Figure 2B:
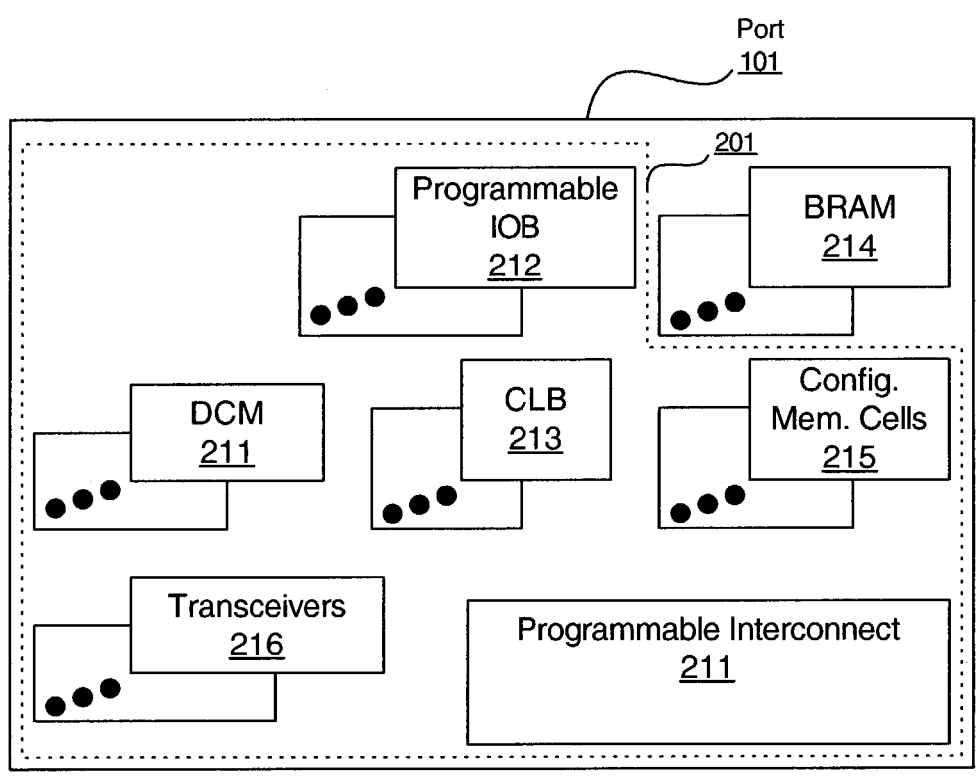
FIG. 2B depicts a block diagram of an exemplary embodiment of a port.

FIG. 2B is a block diagram of an exemplary embodiment of a port 101. Network interface modules 201-1, -2, -3 and -4 include one or more of programmable IOBs 212, one or more of DCMs 211, one or more of CLBs 213, one or more of configuration memory cells 215, one or more of I/O transceivers 216 and a programmable interconnect 211. Transceivers need not be used, as separate receivers and transmitters may be used. Notably I/O transceivers may be for any of a variety of mediums, such as wired, wireless and photonic whether analog or digital. Though, as mentioned above, a gigabit router for wired Ethernet communications is described, where I/O transceivers are gigabit or multi-gigabit transceivers. Port 101 may be implemented using an FPGA from the Virtex™-II Pro family of products available from Xilinx® of San Jose, Calif.

Though a unidirectional point-to-point mesh topology has been described, other topologies may be used, as described below. Furthermore, with renewed reference to FIG. 2A and continuing reference to FIG. 2B, ports 101 include one or more of block random access memories (BRAMs) 214 coupled to network interface modules 201. BRAMs 214 provide memories 202, 206 for network interface modules 201. In the exemplary embodiment described, BRAMs 214 are dual-port buffers, where there is a BRAM on each of 20 internal links provided via buses 204, 205. Dual ported memory need not be used, as single ported memory may be used.

Accordingly, each communication port 101 has four "get" buffers from which it reads information, such as packets, where each such "get" buffer is respectively written to by another port 101 or hub 102. Also, hub 102 has four "get"

buffers from which it reads information, such as packets, where each such "get" buffer is respectively written to by a port 101.

Notably, for a Virtex™-II Pro FPGA implementation, buffer word size is 36 bits, and data path widths for a point-to-point interconnection network may then be 36 bits wide. Of course, longer or shorter bit widths may be used.

When a write is attempted to a full buffer, the word to be written is discarded, and an overflow flag is raised. However, there is a commitment mechanism, described below in additional detail, for storing complete packets in buffers to avoid leaving a packet fragment if a buffer overflow conditions occurs in intra-packet. Each port 101, or hub 102, selects packets for transmission or for further processing, for example selecting on a round robin basis. This round robin selection process is implemented in configured logic 105 at ports 101 and by code for processor 106 at hub 102.

Figure 3A:
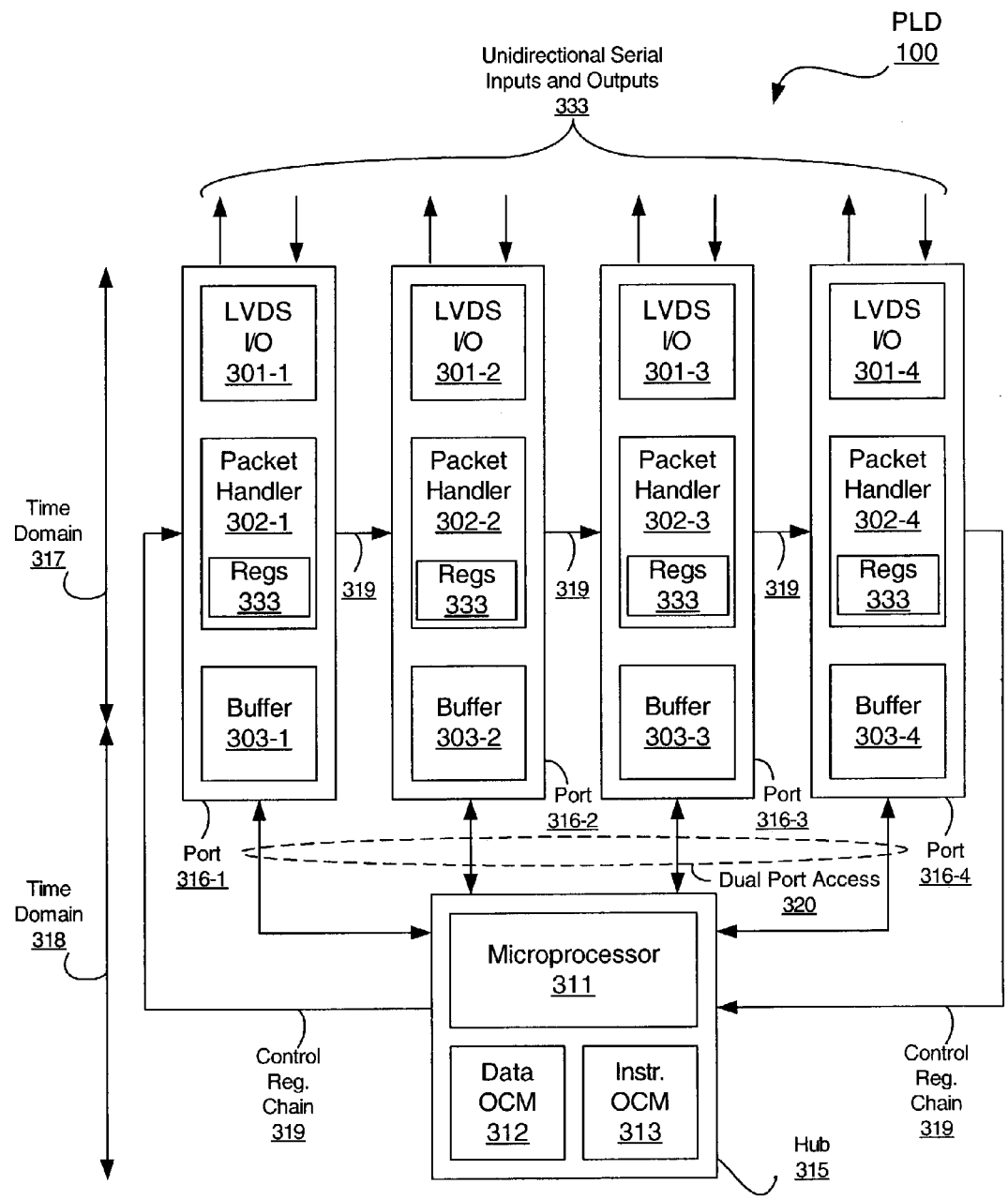
FIG. 3A depicts a block diagram of an exemplary embodiment of a PLD with a star topology and a processor centric architecture.

FIG. 3A is a block diagram of an exemplary embodiment of a PLD 100 with a star topology and a processor centric architecture. In this exemplary embodiment of PLD 100, ports 316-1, -2, -3 and -4 are coupled to one another via hub 315 in a star topology. Each port 316-1, -2, -3 and -4 respectively includes: a low-voltage differential signaling I/O network interface 301-1, -2, -3 and -4; a packet handler 302-1, -2, -3 and -4; and buffer memory 303-1, -2, -3 and -4. Ports 316-1, -2, -3 and -4, and more particularly dual ported buffer memories 303-1, -2, -3 and -4, are connected to hub 315 via dual port access 320.

Hub 315 has a microprocessor 311, data on-chip memory (OCM) 312, and instruction OCM 313. Hub 315 and ports 316-1, -2, -3 and -4 are serially connected to one another in a closed control loop via a device control register (DCR) chain 319. DCR chain 319 is used by microprocessor 311 to read from and write to control and status registers of packet handlers 302-1, -2, -3 and -4. Machine code instructions, move to DCR (mtdcr) and move from (mfdcr) may be used for reading and writing to control and status registers 333 of packet handlers 302-1, -2, -3 and -4.

Two time domains 317 and 318 are used for this architecture. Time domain 318 is for operation of microprocessor 311, and time domain 317 is for transmission of data. So, for example, for serial transmission at gigabit Ethernet rates a clock rate of approximately 31.25 MHz may be used, whereas operation of microprocessor may be at approximately 300 MHz. The two time domains may be interfaced at dual ported buffer memories 303-1, -2, -3 and -4, where information is written in and read out in time domain 318 for microprocessor 311 and is written in and read out in time domain 317 for packet handlers 302-1, -2, -3 and -4, as well as low-voltage differential signaling I/O network interface 301-1, -2, -3 and -4.

In this exemplary embodiment, PLD 100 is a processor-centric architecture. Packet handlers 302 handle physical (PHY) layer framing for transmitted packets and recognition of PHY layer framing for received packets. However, all packets received by PLD 100 pass through hub 315 prior to being routed from PLD 100. This is because packet handlers 302 are only "semi-intelligent," meaning that packet handlers 302 are not configured for high-level medium access protocol (MAC) and Internet Protocol (IP) related functions, and consequent packet manipulation and routing, all of which is done by hub 315.

Figure 3B:
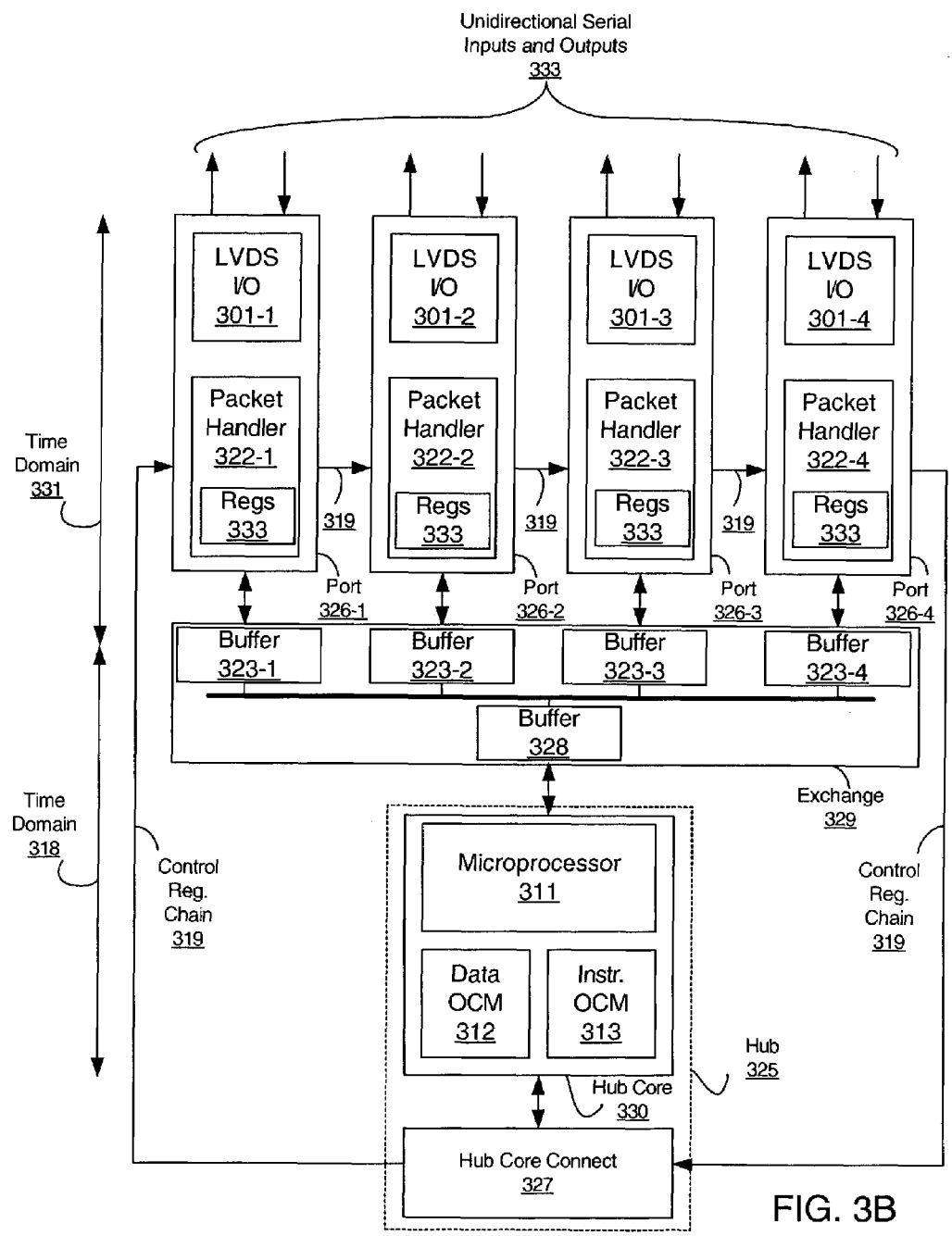
FIG. 3B depicts a block diagram of an exemplary embodiment of a PLD with a bus topology and a logic-centric architecture.

FIG. 3B is a block diagram of an exemplary embodiment of a PLD 100 with a bus topology and a logic-centric architecture. In this exemplary embodiment of PLD 100, ports 326-1, -2, -3 and -4 are coupled to one another via a bus topology of exchange 329. Each port 326-1, -2, -3 and -4 respectively includes: a low-voltage differential signaling I/O interface 301-1, -2, -3 and -4; and a packet handler 322-1, -2, -3 and -4.

Hub 325 exchanges packets with ports 326 via exchange 329. Exchange 329 includes a bus topology used to connect ports 326 with hub 325. Exchange 329 is an interconnection network. Inclusion of exchange 329 moves away from the more hub-centric architecture of the exemplary embodiment of FIG. 3A. Exchange 329 includes buffer memories 323-1, -2, -3 and -4, which are respectively associated with buffering information to ports 326-1, -2, -3 and -4. Exchange 329 includes buffer memory 328 associated with buffering information to and from hub 325. Dual ported buffer memories 328, and 323-1, -2, -3 and -4 may be used.

Hub core 330 has a microprocessor 311, data OCM 312, and instruction OCM 313. Hub 325 and ports 326-1, -2, -3 and -4 are serially connected to one another in a closed control loop via a DCR chain 319. More particularly, hub core 330 is connected to hub core connect 327, and hub core connect 327 of hub 325 is serially connected via DCR chain 319 to ports 326-1, -2, -3 and -4 in a closed loop.

While inclusion of hub core connect 327 is a slight departure for the logic-centric architecture of this embodiment of PLD 100, addition of hub core connect 327 to hub 325 provides for additional configuration possibilities. For example, connection of off-chip or off-PLD 100 memory is facilitated by inclusion of hub core connect 327. Also, for example, hub core connect 327 provides a mapped memory interface between microprocessor 311 and control and status registers 333 of ports 326-1, -2, -3 and -4. This facilitates program access to such control and status registers by direct memory access (DMA). Hub core connect 327 is used for processor local bus (PLB) to on-chip peripheral bus (OPB) to DCR bridging. This bridging to DCR chain 319 allows microprocessor 311 to have access to control and status registers 333 of packet handlers 322. For microprocessor 311 a PowerPC processor, hub core connect 327 may be an IBM CoreConnect architecture.

Notably, hub core connect 327 is optional, and may be removed. If hub core connect 327 is not present, access to packet buffers of exchange 329 may be done with data-side OCM (DSOCM) access from microprocessor 311. If hub core connect 327 is not present, packet handlers 322 status and control register access may be through mfdcr and mtdcr machine code instructions for direct access to DCR registers, as described above.

Two time domains 331 and 318 are used for this logic-centric architecture. Time domain 318 is for operation of microprocessor 311, and time domain 331 is for transmission of data and for dual-threaded operation for massage-style functions, as described below. Thus, time domain 331 may be a dual clock time domain. So, for example, while time domain 331 may be for serial transmission at gigabit Ethernet rates a clock rate of approximately 31.25 MHz, it may have another clock rate for dual-threaded operation for massage-style functions of approximately 62.5 MHz, whereas operation of microprocessor may be at approximately 300 MHz.

In this exemplary embodiment, PLD 100 is a logic-centric architecture. Packet handlers 322 handle PHY layer framing for transmitted packets and recognition of PHY layer framing for received packets. Furthermore, in this exemplary embodiment, not all packets received by PLD 100 pass through hub 325 prior to be routed from PLD 100. This is because packet handlers 322 are more than "semi-intelligent," meaning that packet handlers 322 are configured for high-level medium access protocol (MAC) and Internet Protocol (IP) related functions, and consequent packet manipulation and routing.

Figure 3C:
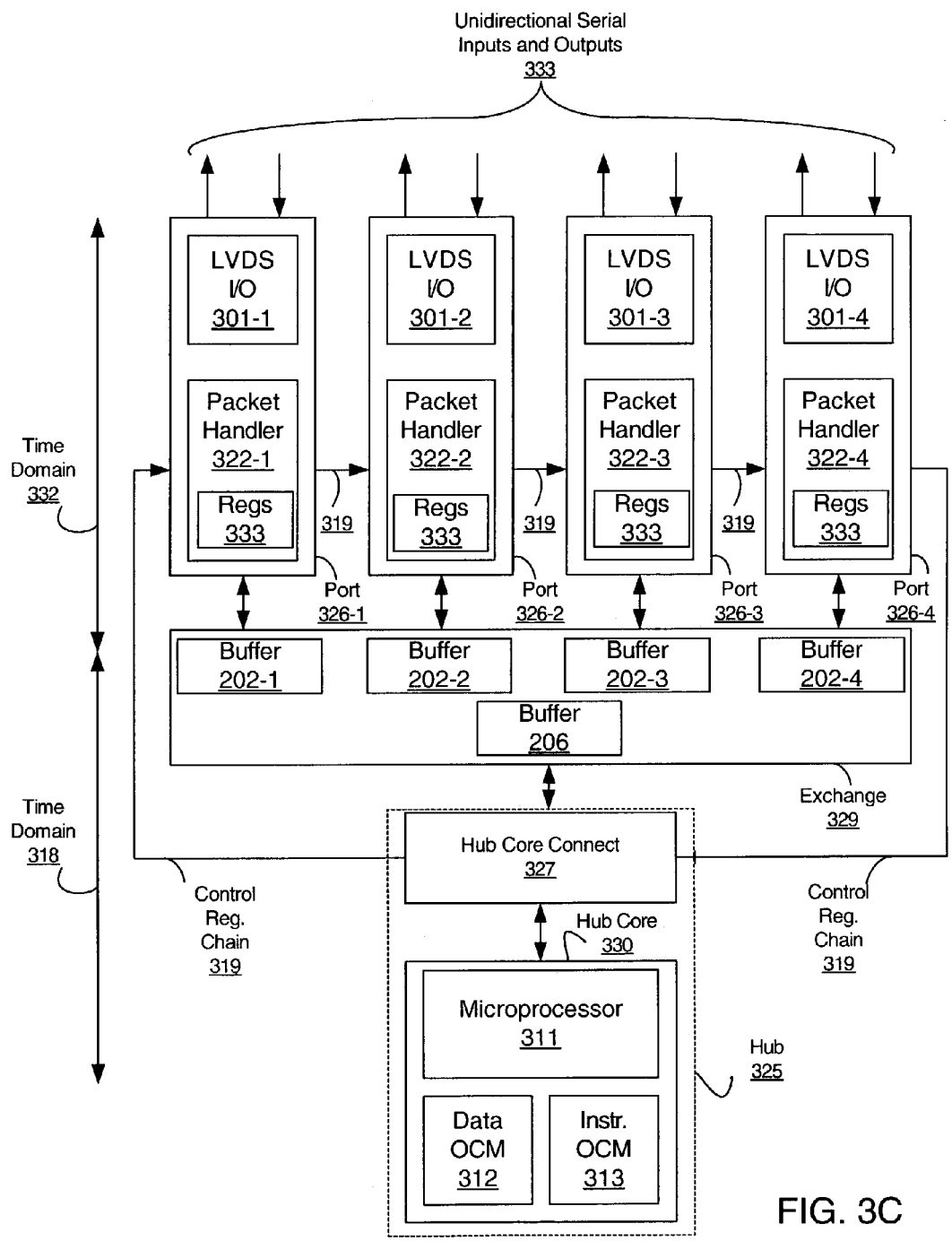
FIG. 3C depicts a block diagram of an exemplary embodiment of a PLD with a point-to-point mesh topology and a logic-centric architecture.

FIG. 3C is a block diagram of an exemplary embodiment of a PLD 100 with a point-to-point mesh topology and a logic-centric architecture. The exemplary embodiment of PLD 100 of FIG. 3C is similar to the exemplary embodiment of PLD 100 shown in FIG. 3B, and accordingly same description is not repeated. A difference is that a point-to-point mesh topology for exchange 329 is used, as described in additional detail with reference to FIG. 2A. Another difference is that hub core connect 327 of PLD 100 of FIG. 3C is located between exchange 329 and hub core 330. Thus, microprocessor 311 has access to packets in buffers of exchange 329 via hub core connect 327.

Two time domains 332 and 318 are used for this logic-centric architecture. Time domain 318 is for operation of microprocessor 311, and time domain 332 is for synchronous operation with a gigabit Ethernet interface. So, for example, while time domain 332 may be for serial transmission at a gigabit Ethernet rate of 31.25 MHz, a clock rate of approximately 62.5 MHz may be used for packet handling by logic circuitry of ports 326. A DCM may be used to provide each clock domain.

Notably, other network topologies for connecting ports, such as a ring topology, a hypercube topology and its derivatives, and the like, may be used. Furthermore, two or more of the topologies described herein may be combined to form a hybrid topology.

For hub 325, interfacing to buffers 202 and 206, namely, respectively four buffers each for writing and reading, is random access for microprocessor 311. Access to 36 bit word spaces is through a 64-bit PLB interface in hub core connect 327, though an interface with a longer or shorter interface than 64 bits may be used. In addition to direct access to content in buffers 202 and 206, through DCR microprocessor 311 has access to get and put pointers denoting current positions of packet reading and writing from and to buffers 202 and 206. Microprocessor 311 has read access to all pointers and write access only to those pointers controlled by hub 325.

Figure 6A:
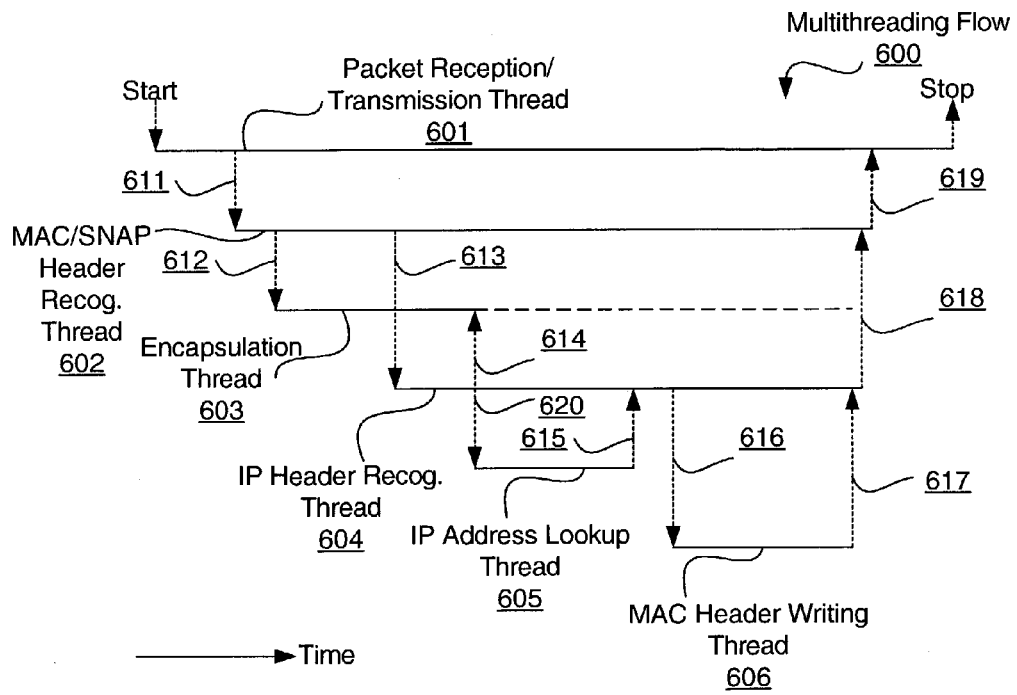
FIG. 6A depicts a timeline diagram of an exemplary embodiment of a multithreading flow.

Ports 326 have a "first-in, first-out-like" (FIFO-like) interface. Basically, 36 bit words can be read from and written to buffers 202, and written to buffer 206, on a FIFO basis, with no explicit memory addressing by port logic. The term "FIFO-like" is used because though a packet receiving thread (main thread 601 of FIG. 6) stores words using a FIFO discipline, massage threads of FIG. 6 are allowed to write to buffer memory without the FIFO restriction.

Figure 4:
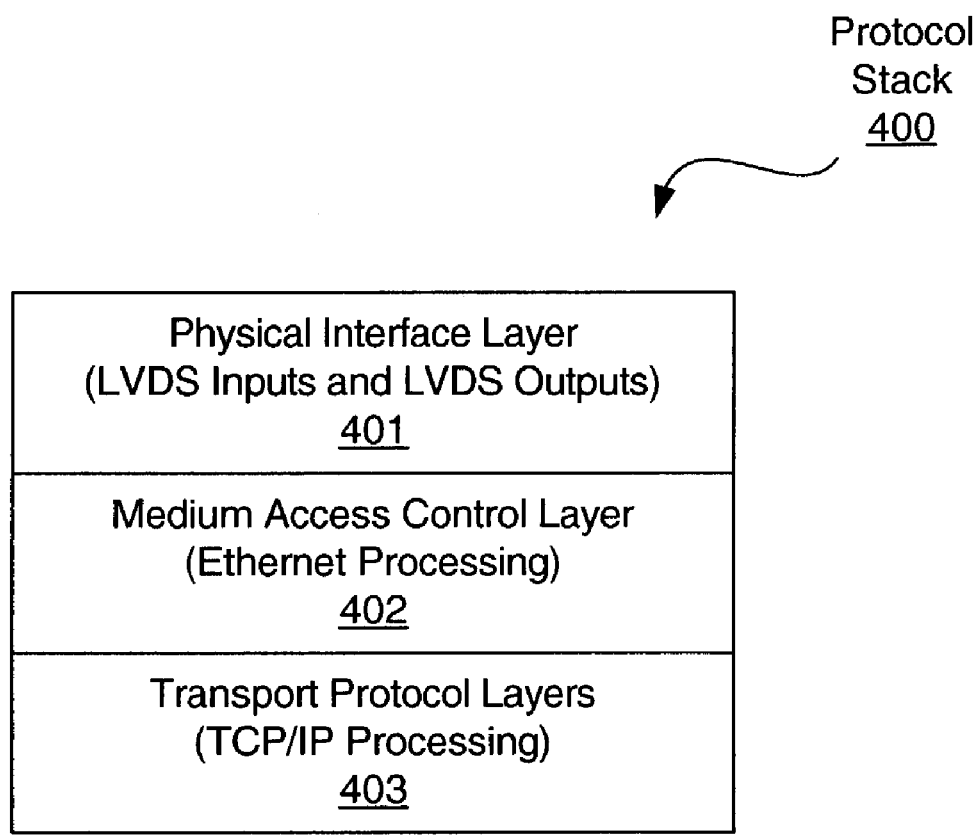
FIG. 4 depicts a block diagram of an exemplary embodiment of a protocol stack.

FIG. 4 is a block diagram of an exemplary embodiment of a protocol stack 400. With continuing reference to FIG. 4 and renewed reference to FIG. 1, protocol stack 400 is described. Which layers of protocol stack 400 are handled by configured logic and which are handled by a software controlled processor will depend on which architecture is used, namely, a processor-centric, logic-centric or hybrid architecture, and will depend on functionality, using configured logic, of ports. For clarity, it will be assumed that a logic-centric architecture is used where packet handlers 322, formed at least in part of configured logic, are configured to handle at least approximately 80% of packets. Additionally, it will be assumed that a mixed version router for handling IP version 4 ("IPv4") and IP version 6 ("IPv6") protocols is described; however, it will be apparent to one of ordinary skill in the art that configurable logic may be configured to handle other known protocols, including but not limited to Asynchronous Transfer Mode (ATM), Synchronous Optical Network (SONET), Synchronous Digital Hierarchy (SDH), Home Phoneline Network Alliance ("HomePNA" or "HPNA"), wireless ("IEEE 802.11"), and the like. Furthermore, while protocol stack 400 is from a lowest layer physical interface layer 401 to a MAC layer 402 and then to transport protocol layers 403, it should be understood that use of configurable logic allows for layers higher than transport protocol layers 403 to be at least partially instantiated in logic. Additionally, a non-mixed version router may be implemented.

Packet services are classified into coarse-grain services and fine-grain services. By coarse-grain services, it is meant to include configured logic 105 offloading a packet to an embedded processor 106 as a network server, and an embedded processor 106 offloading a packet to configured logic 105 as a network server. Examples of coarse-grain services are packet transmission and packet reception. By fine-grain services, it is meant to include configured logic 105 using an embedded processor 106 to perform functions on a packet, and an embedded processor 106 using configured logic to perform functions on a packet. Examples of a fine-grain service are to identify packet protocol type, and address matching for format and locality.

System functions are classified into lookup-style functions, routing-style functions and massage-style functions. Lookup-style functions are associated with searching routing or tunneling tables. Routing-style functions are associated with internal buffering or forwarding of packets. Massage-style functions are associated with encapsulation, decapsulation, fragmentation or translation. Each of these system functions may be implemented in ports 101 or hub 102. However, there may be advantages to having some limited set of functionality in ports 101 and a more complete set of functionality in hub 102. So, for example, all IPv4 pass-through packets and IPv4 packets heading for IPv6 tunnels may be handled entirely with ports 101 with configured logic 105, and all other IPv4 packets and all IPv6 packets may be handled by hub 102 with embedded processor 106. This particular division of labor was chosen for a network where the majority of traffic is IPv4 packets. However, it should be understood that such division of labor is ostensibly artificial, and thus any of a variety of divisions between logic-handled communications and processor-handled communications, or a hybrid thereof, may be used. Thus, it should be appreciated that by having configurable logic, such divisions of labor may be tailored or otherwise adjusted to environmental surroundings in which PLD 100 is to be located.

Figure 5A:
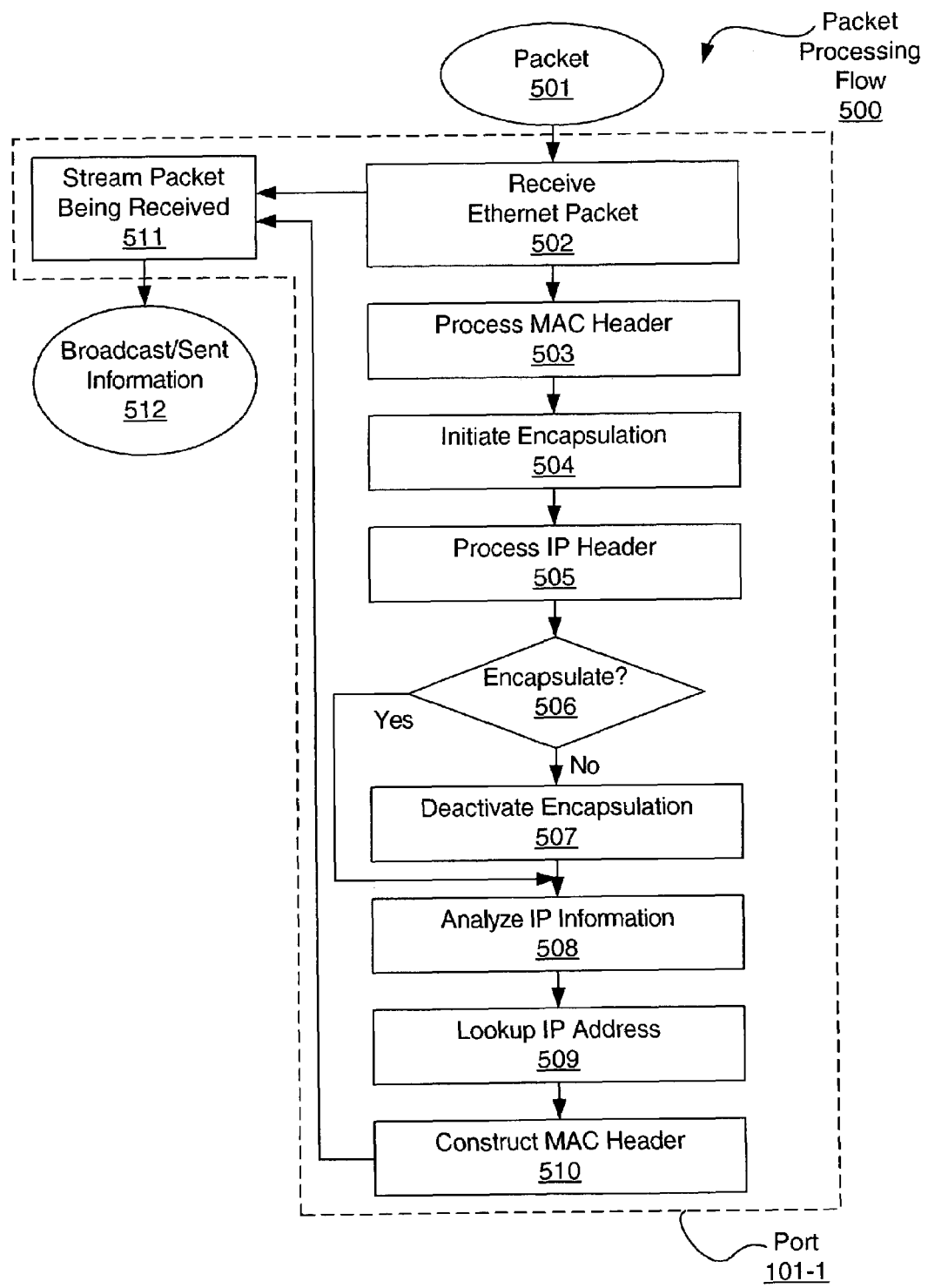
FIG. 5A depicts a flow diagram of an exemplary embodiment of a packet process flow for a port.

With renewed reference to FIGS. 1, 2A and 2B, and additional reference to FIG. 5A, where there is shown a flow diagram of an exemplary embodiment of a packet process flow 500 for a port 101, packet processing with multithreading is described. A packet 501 is received to a buffer memory 202 of a port 101 at 502. For purposes of description by example, it is assumed that packet 501 is from an off-chip local or remote source.

At 502, a packet being received into buffer memory 202 causes an on-chip broadcast communication thread ("streaming thread") to be initiated at 511. Thus, packet 501 as it is being received is broadcast as a data stream 512 to all other ports and hubs. To reduce or eliminate the number of complete copies of packets made to buffers and to reduce latency, a packet being received is broadcast to all output buffers on exchange 329. This broadcasting is done independently of whether any massage-style functions need to be performed on packet 501. Furthermore, a packet is received over time, so a complete packet is not broadcast to all output buffers, such as four output buffers in the above-described exemplary embodiment of FIG. 2A. Once a sufficient portion of a header for packet 501 is received and analyzed, broadcasting is turned off. However, a streaming thread at 511 is used to continue to send a data stream for packet 501 to a designated port (or hub), and thus subsequent received words of packet 501 are sent for writing only to a buffer of a designated port (or hub). Thus, continuing the example, a complete copy of packet 501 is made only to one other port 101 prior to be routed off-chip, or to hub 102 and then possibly to one other port prior to being routed off-chip.

Figure 5B:
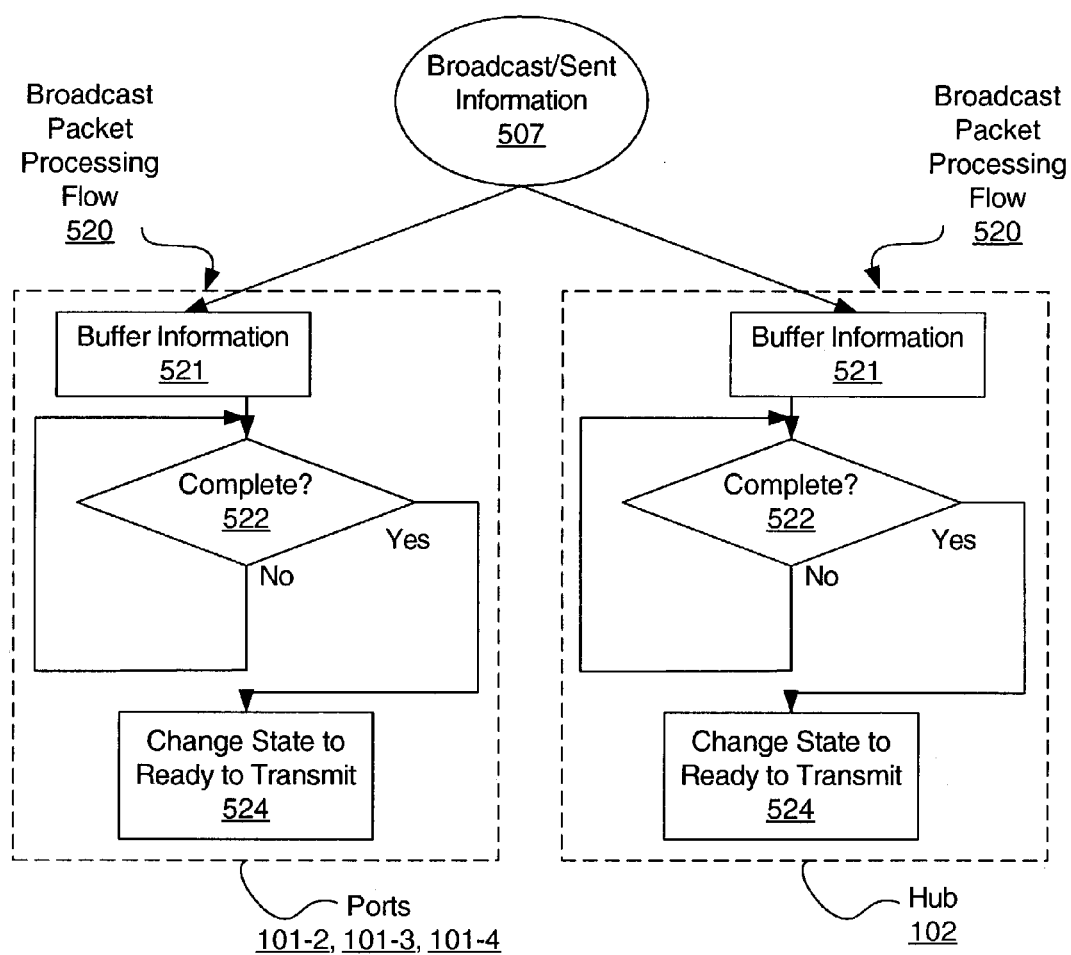
FIG. 5B depicts a flow diagram of an exemplary embodiment of a broadcast packet processing flow.

So, for example, FIG. 5B is a flow diagram of an exemplary embodiment of a broadcast packet processing flow 520. With continuing reference to FIG. 5B and renewed reference to FIG. 5A, broadcast packet processing flow 520 is described. Suppose that packet information streaming into port 101-1 is broadcast to ports 101-2, -3 and -4 and to hub 102. Then each of ports 101-2, -3 and -4 and hub 102 will execute a broadcast packet processing flow 520. At 521, broadcast information is buffered. After turning off broadcasting, information is sent to either a designated port or hub. So, assuming information is sent to hub 102 from port 101-1 after broadcasting is turned off, broadcast packet processing flows 520 will have different outcomes. For ports 101-2, -3 and -4, broadcast information is buffered at 521. At 522, a determination is made as to whether a complete packet has been buffered by whether a buffer pointer variable has been advanced. A buffer pointer variable may be repeatedly polled for this determination. As ports 101-2, -3 and -4 are not the designated destination, this determination will be that a packet is not complete because the buffer pointer variable will not have been advanced. Eventually information from another packet will arrive thus overwriting the fragment stored for a prior packet.

However, continuing the above assumption, for hub 102 a different outcome will result. Broadcast and point-to-point sent information is buffered at 521. Though at 522 it may be determined a complete packet has not been received, the process will continue to loop, until eventually at 522 it will be determined that a complete packet has been received, namely, that a buffer pointer variable has been advanced. Hub 102 processes received packets in accordance with programming of the microprocessor, and hub 102 clears packets from buffer memory by advancing a buffer pointer variable.

Returning to FIG. 5A, any massage-style functions to be done on packet 501 are done in parallel with packet reception. Thus, with continuing reference to FIG. 5A and additional reference to FIG. 6A, where there is shown a timeline diagram of an exemplary embodiment of a multithreading flow 600, multithreading is described in terms of a single control flow within each thread, where data flow occurs in circuitry. A control flow within each thread corresponds to a finite state machine instantiated in configured logic. Thus, each state machine stays in an initial or a wait state until a particular stimulus is received. Such stimulus may be from a packet being received or from a trigger signal from another thread. Individual threads may be activated or deactivated by other threads by configured logic, such as by using one-bit flags to cause transitions into or out of such a wait state. Communication between such finite state machines may be done with shared registers synchronized to prevent conflict, as described below in additional detail. In response to such stimulus, each state machine executes a procedure, after which such state machine returns to a wait state. Context of each thread is therefore determined by current state of its associated finite state machine and contents of one or more registers of circuitry for such finite state machine. Notably, contents of all registers combined may be used to determine a state, or contents of a single register may be used to determine a state.

Before proceeding to description of a multithreading embodiment, it should be understood that configurable logic is being used to implement multithreading. Accordingly, threads other than those specifically disclosed herein may be instantiated in such configurable logic by programming circuitry and initializing state of such circuitry programmed.

Furthermore, it should be appreciated that multiple logic blocks may be operated in parallel using multithreading. Thus, all registers for all threads may be used without having to swap data, unless total thread circuitry exceeds available physical resources, in which event virtual circuitry may be used.

At 502, a packet is being received, and packet reception/transmission thread ("main thread") 601 is initiated. Main thread 601 causes a portion of packet 501, namely, packet portion 507 to be broadcast to other ports 101 and hub 102.

At 503, processing of a MAC header of packet 501 is done. Main thread 601 responsive to trigger signal 611 initiates MAC header recognition thread 602. Notably, there are many frame types for Ethernet, such as Ethernet 802.3, Ethernet 802.3 RAW, Ethernet II, Ethernet 802.2 (SAP) and Ethernet SNAP, among others. Therefore, for clarity, only MAC/SNAP is considered here, though other Ethernet frame types may be used. MAC header recognition thread 602 is run to identify MAC frame type.

MAC/SNAP header recognition thread 602 is activated responsive to main thread 601 recognizing a PHY header of packet 501. Activation of MAC/SNAP header recognition thread 602 may be done by raising a trigger signal, such as trigger signal 611, between threads 601 and 602. Meanwhile, main thread 601 continues receiving a bit stream for packet 501 and thus subsequent words of packet 501 continue to be broadcasted and buffered. Each word received may also be placed in a shared register for examination by header recognition threads clocked at the next half-cycle, described below in additional detail.

Encapsulation is initiated at 504. MAC/SNAP header recognition thread 602 sends trigger signal 612 in speculation that packet 501 will need to be encapsulated. Trigger signal 612 triggers encapsulation thread 603. For this exemplary embodiment, IPv4 and IPv6 are described, and in particular, as most of the Internet is presently IPv4, described is encapsulating IPv4 packets with IPv6 encapsulation to continue the above example. Accordingly, encapsulation thread 603 is initiated early just in case encapsulation needs to be done, in which event such encapsulation may be done prior to the completion of an associated main thread 601.

By activating IPv6 encapsulation thread 603, a state machine associated therewith tracks each of six MAC/SNAP header words in turn, until the final word of the six reveals the actual protocol of packet 501, namely, IPv4, IPv6, or some other protocol. Notably, if multiple encapsulation protocols could be done, such as IPv4 or IPv6 encapsulation, then encapsulation thread 603 would be selected opposite the protocol of packet 501, and tracking for the MAC/SNAP header for this selection of encapsulation thread 603 may be done by MAC/SNAP header recognition thread 602, as such tracking is used anyway as described below. However, as the example is only dealing with the possibility of IPv6 encapsulation, selection of which encapsulation thread to use is not done. Also, the six-word MAC/SNAP header is stored, as the old MAC/SNAP header, and then just overwritten with the new MAC/SNAP header. In the above-described buffers broadcasted to by port 101, is a ten-word IPv6 header starting at a point that is ten words ahead of the first word stored from incoming packet 501. In other words, an incoming packet 501 is stored with an offset of ten words deep in a buffer, leaving room for building an IPv6 header in front of the received packet's IPv4 header for purposes of encapsulation.

At 505, IP header information is processed. MAC/SNAP header recognition thread 602 via trigger signal 613 activates an IP header recognition thread 604. IP header recognition thread 604 is a protocol specific thread selected among a plurality of threads. So, continuing the above example, if MAC/SNAP header recognition thread 602 identifies an IPv4 header for packet 501, then an IPv4 header recognition thread 604 is activated, and if MAC/SNAP header recognition thread 602 identifies an IPv6 header for packet 501, then an IPv6 header recognition thread is activated. If some other protocol is used for which port 101 does not have configured logic, such a packet is sent to hub 102 for processing with a programmed embedded processor. MAC/SNAP header recognition thread 602 thereafter waits for threads it triggered, namely, threads 603 and 604 to be finished, and in response to completion of such threads, MAC/SNAP header recognition thread 602 signals via done signal 619 its own completion to main thread 601.

At 506, it is determined if encapsulation is to be done. IP header recognition thread, either IPv4 or IPv6, 604 can, via stop signal 614, deactivate encapsulation thread 603 after ascertaining that encapsulation is not to be done and prior to encapsulation. In other words, if IP header recognition thread 604 identifies a destination address which is the same protocol as such thread 604 is, encapsulation does not have to be done. If, however, for example a destination address is of an IPv6 type, and IP recognition thread 604 is an IPv4 thread, then encapsulation is allowed to proceed. IP header recognition thread 604 operates similarly for IPv4 and IPv6 header recognition threads, so only IPv4 operation is described here for purposes of clarity.

If encapsulation is not to be done, then at 507 encapsulation is deactivated. In the exemplary embodiment, IPv4 header recognition thread 604 recognizes that IPv6 encapsulation is not to be done, and thus deactivates encapsulation thread 603 via deactivation signal 614.

If encapsulation is to be done, then encapsulation thread 603 runs to completion as block 507 is bypassed. If IPv6 encapsulation is to be done or if such encapsulation had been deactivated, then at 508 IP analysis of a packet 501 continues by obtaining an IPv4 destination address from packet 501. At 509, once an IP destination address is obtained from packet 501, a table lookup is done using the IPv4 destination address as an index. Each port 101 has its own lookup table for performing routing, where a packet IP destination address or index therefor is stored in association with an Ethernet destination address. Notably, it should be understood that in the exemplary embodiment dual-ported memory, for example in exchange 329, allows for dual access to lookup tables. Furthermore, dual-ports allow for an embedded processor to initialize and update such lookup tables, and this access may be through a PLB of the embedded processor. Again, many known details regarding routing, bridging, and format, which may be instantiated in ports 101 or hub 102, are not described in any detail for purposes of clarity.

IPv4 header recognition thread 604 asserts trigger signal 620 to begin IP address lookup thread 605. IP address lookup thread 605 looks up routing information from memory, which in this example such memory is associated with port 101, and then indicates availability via available signal 615 of such looked up address to IPv4 header recognition thread 604.

At 510, a MAC header is constructed. After IP header recognition is complete along with any IP address lookup, IP header recognition thread 604 via trigger signal 616 initiates MAC header writing thread 606 provided. Notably, IPv4 header recognition thread 604 can detect when an IPv6 packet is contained within an IPv4 packet, in which event IPv4 header recognition thread 604 deactivates itself and activates IPv6 header recognition thread 604. MAC header writing thread 606 provides a new MAC header in advance of packet 501 for immediate transmission. Alternatively, as mentioned above, MAC header writing thread 606 may overwrite the previous MAC header of packet 501 for onward routing with a new six-word MAC/SNAP header, followed by a new ten-word IPv6 header in front of the original IPv4 header if encapsulation is done, followed by contents of packet 501.

Notably, if port 101 did not have configured logic to perform the converse encapsulation operation, namely, encapsulation of an IPv6 packet within an IPv4 packet, an IPv6 header recognition thread 604, as well as an IPv6 encapsulation thread 603, would run to completion but without any effect. After which, main thread 601 would send packet 501 to hub 102 for parsing, encapsulation and forwarding using programming for an embedded processor.

Once completed, MAC header writing thread 606 signals its completion via done signal 617, which in turn causes IPv4 header recognition thread 604 to send a done signal 618 to MAC/SNAP header recognition thread 602, which in turn causes MAC/SNAP header recognition thread 602 to send done signal 619 to main thread 601.

Main thread 601 then causes packet 501, with or without encapsulation, to be routed to another port 101 or hub 102. Notably, it should be understood that prior to an entire packet 501 being received all threads of multithreading flow 600 applied to processing such a received packet 501 will have completed. Thus, such a packet is ready for outgoing transmission from another designated port 101 or for further processing at hub 102. With respect to transmitting a packet 501 off-chip from another designated port, no packet massage and no packet analysis need be done.

Figure 5C:
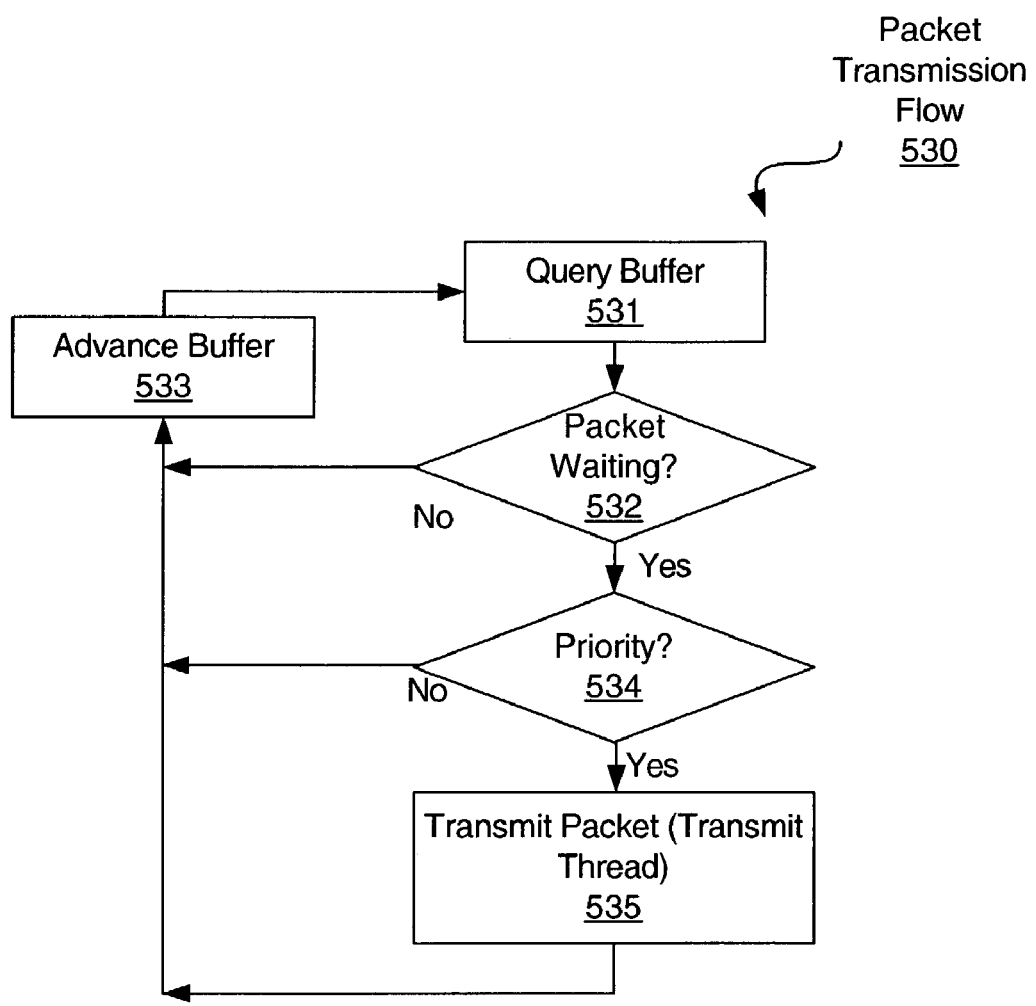
FIG. 5C depicts a flow diagram of an exemplary embodiment of a packet transmission flow.

Referring to FIG. 5C, there is shown a flow diagram of an exemplary embodiment of a packet transmission flow 530. Packet transmission flow 530 is for transmission on-chip (e.g., port-to-port, hub-to-port or port-to-hub) and for off-chip transmission. Packet transmission flow 530 may be instantiated in configured logic as a state machine, as a respective continuously looping thread running on each port and hub.

At 531, an output buffer is queried, and at 532 in response to such a query a determination is made as to whether a packet is waiting for transmission. If no packet is waiting for transmission from a queried output buffer, then at 533 the output buffer is advanced, for example to obtain input from another port. If, however, a packet is waiting for transmission, optionally a check for packet priority may be done. Packet priority may be based importance of the packet, status of the client, and congestion of the buffer or of other buffers, among other factors. However, for clarity, it is assumed that round robin querying of output buffers by a port is done without any regard to priority. Accordingly, if a packet is waiting for transmission at 532, then at 535 a packet transmission thread is initiated. A finite state machine may be instantiated in configurable logic for this packet transmission thread. Packet transmission thread causes successive words of Ethernet PHY framing and packet contents to be sent to a transmission interface, such as a transceiver 216. Packet 501, as modified, contents are retrieved in sequence from an output buffer associated with the transmitting port. Such a finite state machine for transmission takes account of packet length (in bytes), generates correct PHY framing with respect to word boundaries (e.g., 32-bit word boundaries) at the end of transmission. After transmitting a packet, the packet transmission thread returns to a wait state, and at 533, the buffer is advanced for subsequent querying at 531.

Threads of multithreading flow 600 are organized to allow for writing to a same buffer. By allowing packet massage in parallel with receipt of a packet, latency is reduced. As indicated above, different blocks of logic of a port 101 operate in parallel using multithreading. Having threads operate on respective clock phases arbitrates packet access. This may be accomplished because access time for accessing a buffer memory may be substantially less than a clock cycle of a thread clock.

Figure 6B:
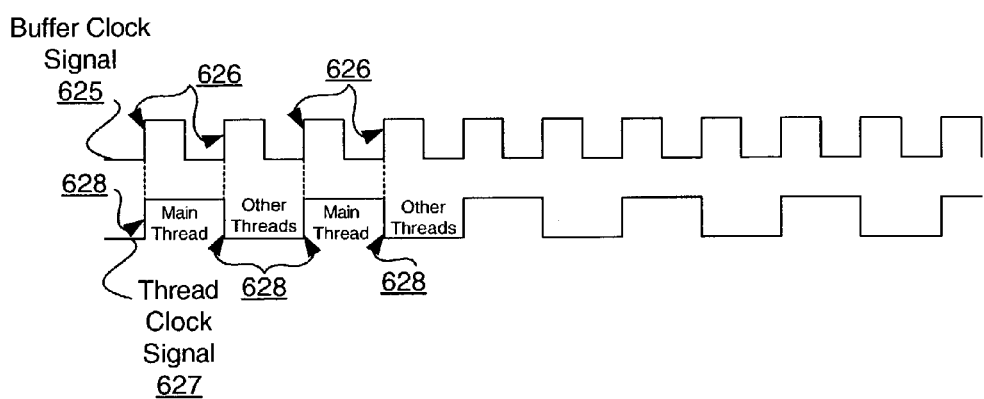
FIG. 6B depicts a timing diagram of exemplary embodiments of a buffer clock signal and a thread clock signal.

So, for example, to avoid conflict when writing to a same buffer at the same time by main thread 601 for storing incoming words and one of either encapsulation thread 603 or MAC header writing thread 606, time division multiplexing may be used. Referring to FIG. 6B, there is shown a timing diagram of exemplary embodiments of a buffer clock signal 625 and a thread clock signal 627. Writing to a buffer may be clocked at twice the rate of clocking of the threads, e.g., a buffer clock may be 62.5 MHz and thread clocks may be 31.25 MHz. Rising edges 626 of buffer clock signal 625 are synchronized with both rising and falling edges 628 of thread clock signal 627. Each buffer is clocked alternately in the middle of a time slice, namely, a thread clock cycle. Thus, for example, 32-bit words of a packet are received with main thread 601 clocked on a leading edge of a thread clock signal 627, where received words are available on the trailing edge of thread clock signal 627. All threads, other than main thread 601, may be clocked on the trailing edge of such a clock signal, as such other threads operate without any possible buffer access conflict. Thus, a thread receiving a packet may be clocked in step with a receiver, such as a transceiver 216, on one-half thread clock cycle, and threads for analyzing or massaging a packet may be clocked an alternate one-half thread clock cycle. Recall from above, for this exemplary embodiment, a write interface to buffers is equipped to allow dual access, such as access to separate ports of a dual-ported BRAM, at alternating memory clock cycles.

Figure 7:
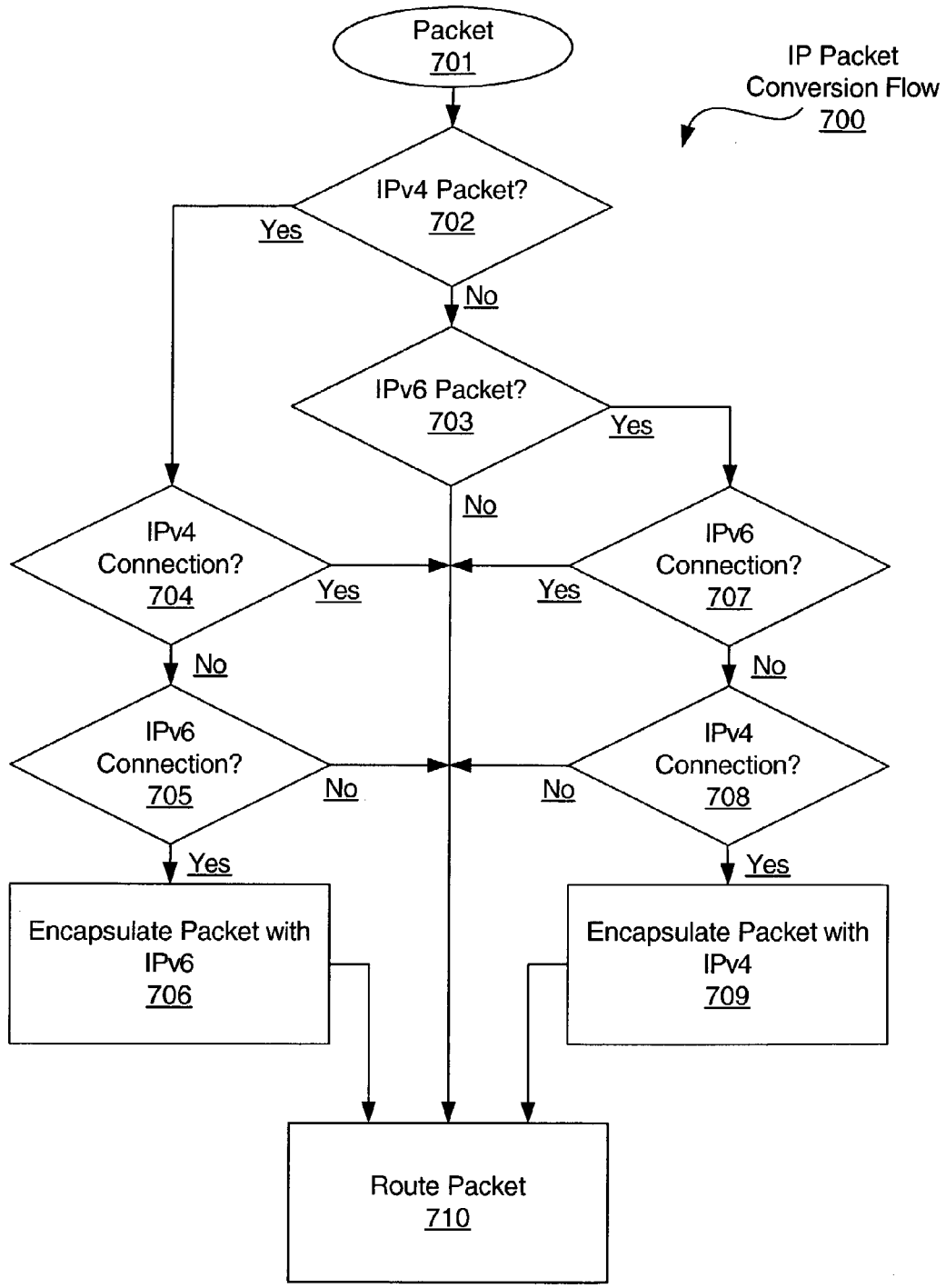
FIG. 7 depicts a flow diagram of an exemplary embodiment of a mixed-mode routing flow for a port.

FIG. 7 is a flow diagram of an exemplary embodiment of a mixed-mode routing flow 700 for a port 101 of FIG. 1. A packet 701 is received to a port 101 of FIG. 1. At 702, a determination is made as to whether packet 701 is an IPv4 packet. If such a packet 701 is an IPv4 packet, then at 704 a determination is made as to whether packet 701 is to be forwarded at a next hop using an IPv4 connection. If an IPv4 packet is to be routed over an IPv4 connection, then at 710 such packet is routed to another port without encapsulation. If, however, at 704, it is determined that an IPv4 connection is not the next hop, then at 705 it is determined if an IPv6 connection is the next hop for routing packet 701. If an IPv6 connection is the next hop for packet 701, then at 706 IPv4 packet 701 is encapsulated with an IPv6 header and routed to another port at 710. If, however, an IPv6 connection is not the next hop for packet 701, packet 701 is routed at 710 to a hub 102 for processing. In other words, in this exemplary embodiment of a mixed-mode port, only IPv4 and IPv6 packets are processed, all other packets have to be processed with a processor of hub 102.

At 702, a determination is made as to whether packet 701 is an IPv4 packet. If such a packet 701 is not an IPv4 packet, then at 703 a determination is made as to whether packet 701 is an IPv6 packet. If such a packet 701 is not an IPv6 packet, then such a packet is routed to hub 102 for processing. If, however, such a packet 701 is an IPv6 packet, then at 707 a determination is made as to whether packet 701 is to be forwarded at a next hop using an IPv6 connection. If an IPv6 packet is to be routed over an IPv6 connection, then at 710 such packet is routed to another port without encapsulation. If, however, at 707, it is determined that an IPv6 connection is not the next hop, then at 708 it is determined if an IPv4 connection is the next hop for routing packet 701. If an IPv4 connection is the next hop for packet 701, then at 709 IPv6 packet 701 is encapsulated with an IPv4 header and routed to another port at 710. If, however, an IPv4 connection is not the next hop for packet 701, packet 701 is routed at 710 to a hub 102 for processing.

Notably, rather than encapsulation, translation may be done. Thus, an IPv4 packet may be converted to an IPv6 packet and an IPv6 packet may be converted to an IPv4 packet at 706 and 709, respectively. Furthermore, one or more translation state machines, depending on the number of protocols handled, would be added to state machines 820. For example, if no encapsulation was done, then one or more encapsulation state machines 814 would be replaced with one or more translation state machines 814. Of course, translation and encapsulation are not necessarily mutually exclusive, and thus both types of functions, and associated state machines, may be present.

The above decisions may be done on a per-packet basis and may be inferred from one or more of source address, destination address, output port, and input port. In the above exemplary embodiment, IP protocol designation may be used to determine whether a packet is an IP packet at all. This information may be stored in routing tables.

Figure 8:
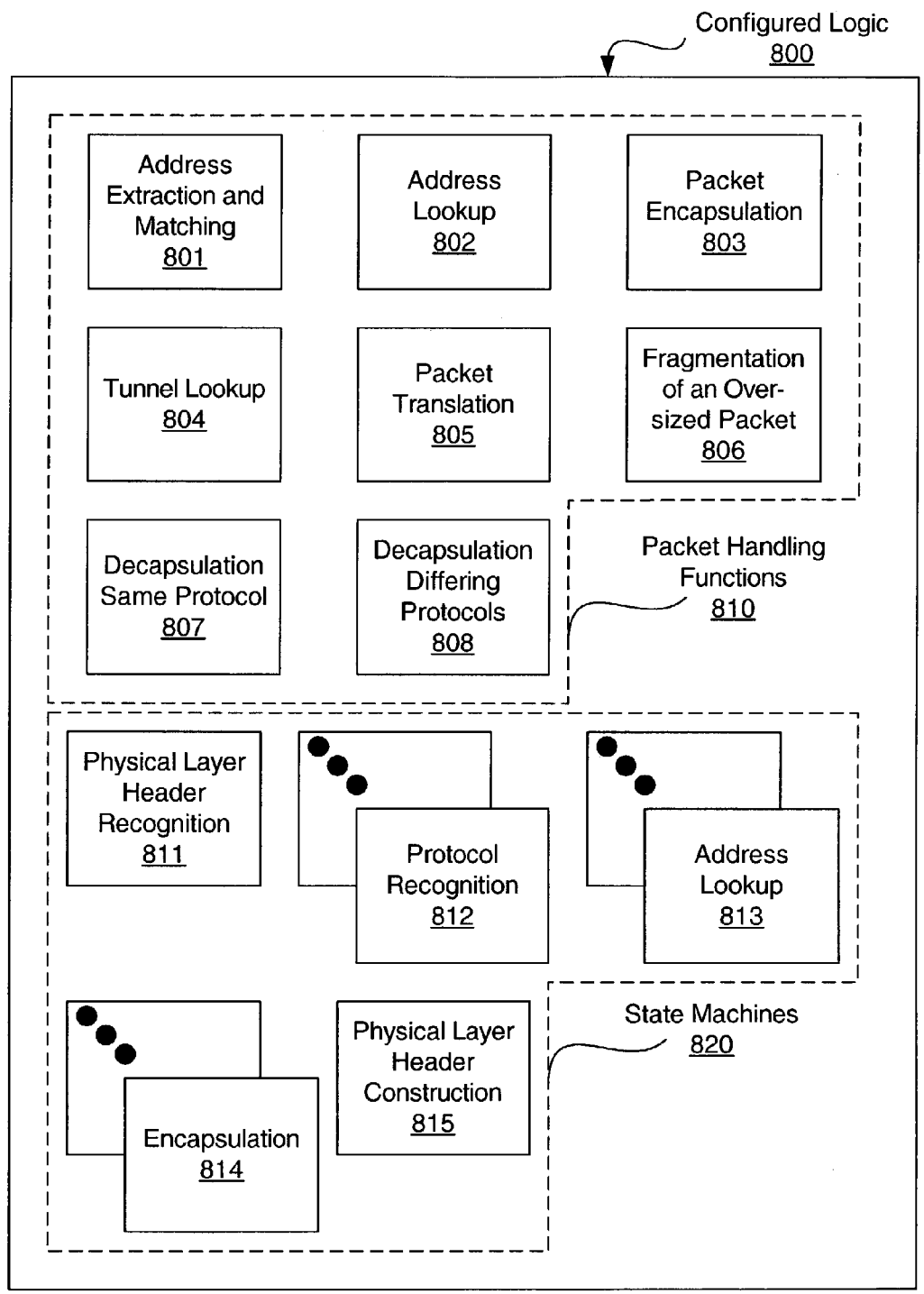
FIG. 8 depicts a block diagram of an exemplary embodiment of configured logic.

FIG. 8 is a block diagram of an exemplary embodiment of configured logic 800. Configured logic 800 may be configured for operation of a port 101 of FIG. 1. Configured logic 800 includes blocks of logic, which are generally grouped as packet handling functions 810 and state machines 820. Packet handling function 810 include several blocks of logic, namely, address and extraction matching 801, address lookup 802, and packet encapsulation 803. These functions are for execution of thread, as described above. However, it should be understood that a set of packet handling functions may exist for each IP protocol configured, such as one set for IPv4 including IPv4 to IPv6 encapsulation and one set for IPv6 including IPv6 to IPv4 encapsulation. Such above described threads are instantiated as state machines 820. State machines 820 logic blocks include physical layer header recognition 811, protocol recognition 812 for each protocol processed at a port, address lookup 813 for each protocol processed at a port, encapsulation for each protocol processed at a port, and physical layer header construction 815. Thus, for example, for IPv4 and IPv6 functionality, there may be one protocol recognition state machine 812 for IPv4 and one for IPv6; there may be one address lookup state machine 813 for IPv4 and one for IPv6; and there may be one IPv4 to IPv6 encapsulation state machine 814 for IPv4 and one IPv6 to IPv4 encapsulation state machine 814 for IPv6. Additional state machines may be instantiated for additional functionality. Additional functionality for IPv4 or IPv6 packet handling may include one or more of tunnel lookup 804, packet translation 805, fragmentation of an over-sized packet ("fragmentation") 806, decapsulation for a same protocol (e.g., IPv4 from IPv4, or IPv6 from IPv6) 807, and decapsulation from differing protocols (e.g., IPv6 from IPv4, or IPv4 from IPv6) 808, among other known functions. Again, though IP protocol functionality is described, it should be understood as mentioned above, that functionality of other known protocols may be employed.

Figure 9A:
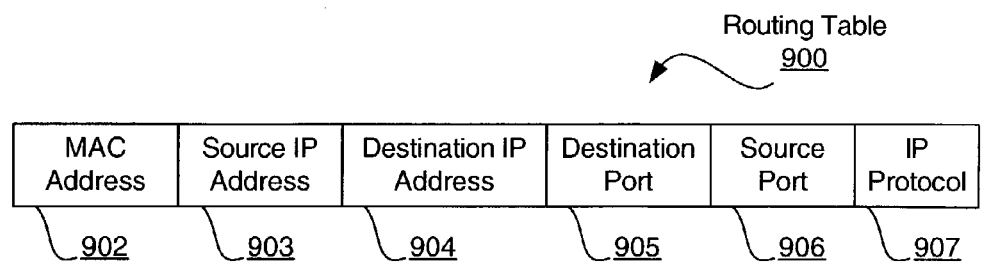
FIG. 9A depicts a block diagram of an exemplary embodiment of a routing table.

FIG. 9A is a block diagram of an exemplary embodiment of a routing table 900. Routing table 900 includes entries for: MAC addresses, such as MAC address 902; source IP addresses, such as source IP address 903, destination IP addresses, such as destination IP address 904, destination ports, such as destination port 905; source ports, such as source port 906; and protocol(s), such as protocol information 907. Protocol information 907 provides an indication of the protocol used for a packet, such as IPv4, IPv6, IPv4/IPv6 or IPv6/IPv4.

An address table format derived from some assumptions about addresses may be used. For example, it may be assumed or known that an organization uses a single Class B IPv4 address and a single 001/TLA/NLA IPv6 address allocated. Notably, variations of IPv4 address type, such as one or more Class C addresses, would not be a significant departure. Within this address space, such an organization allocates addresses to devices connected to an Ethernet network, where IPv4 addresses have an 8-bit network identifier for the Ethernet and an 8-bit interface identifier, and where IPv6 addresses have a 16-bit network identifier for the Ethernet and a 64-bit interface identifier. Notably, this partitioning into two 8-bit quantities may be varied without substantial change. Additionally, some upper bounds on the address space size follow from a limit on the number of Ethernet ports, which in the above example of FIG. 1 is four, and a limit on the number of Ethernet stations, conventionally limited to 1024.

Figure 9B:
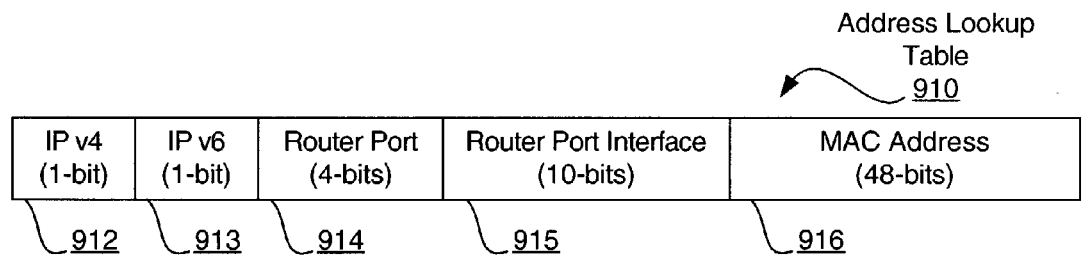
FIG. 9B depicts block diagram of an exemplary embodiment of a format for an address lookup table.

Taking into account the above assumptions on IPv4 and IPv6 address spaces, FIG. 9B is block diagram of an exemplary embodiment of a format for an address lookup table 910. Notably, each entry is allocated 64-bits for each device included on the Ethernet network. Thus, in a two-kilobyte BRAM, approximately 256 device entries may be stored.

Address lookup table 910 includes five fields 912, 913, 914, 915 and 916. Field 912 is a one-bit field for indicating whether IPv4 is in use for a next hop, and field 913 is a one-bit field for indicating whether IPv6 is in use for a next hop. Notably, both bits in IP fields 912 and 913 may be set to indicate that a destination device is capable of processing both IPv4 and IPv6 packets, in which configuration encapsulation would not be needed. These two one-bit fields may be used to guide a router on what functions it is to perform. Notably, a single one-bit field may be used for both, where a zero would for example indicate IPv4 and a one would for example indicate IPv6. Thus, field 912 and 913 may be considered subfields of an IP field. If both IPv4 and IPv6 bits can be asserted for a next hop, then one may be selected, for example according to IP protocol of the packet in order to avoid encapsulation. Notably, fields 912 and 913 may be used to indicate which of IPv4 and IPv6 is used, where a mixed mode packet, an IPv6 packet encapsulated with an IPv4 header or an IPv4 packet encapsulated with an IPv6 header, is indicated as an IPv4 packet when IPv4 encapsulation is used and is indicated as an IPv6 packet when IPv6 encapsulation is used. From the remaining 62-bits, of which 58-bits are used, Ethernet MAC address, IPv4 address, if any, and IPv6 address, if any, all can be looked up.

The 4-bit router port field 914 indicates one of ports 101 of FIG. 1. For the exemplary embodiment of four ports, only two bits of this field could be used.

Router port interface field 915 is 10 bits long, of which only 8-bits are used. Router port interface field 915 is populated with the lower 8-bits of an IPv4 address, if any. An IPv4 address, assumed to be in a Class B address space, has a fixed 16-bit prefix followed by 8-bits corresponding to a network number within an organization, which 8 bits are followed by another 8 bits corresponding to an interface number on the network. It is these last 8-bits that are stored in router port interface field 915. A network number is found with an input lookup of router port field 914 driven by port number, where each port corresponds to a single network.

An IPv6 address has a fixed 48-bit prefix, corresponding to the allocated 001/TLA/NLA value. The next 16 bits correspond to a network number within an organization. The final 64 bits correspond to an interface number on the network coded with EUI-64 encoding defined as two 24-bit halves of a 48-bit MAC address, where the two halves are separated by a fixed 16-bit pattern. Stored in MAC address field 916 are the first and last 24 bits of the lower 64 bits of an IPv6 address, namely, the two 24-bit halves. Notably, a packet will have either an IPv6 or IPv4 destination address, unless encapsulated. However, encapsulated packets use the encapsulation address.

Figure 10:
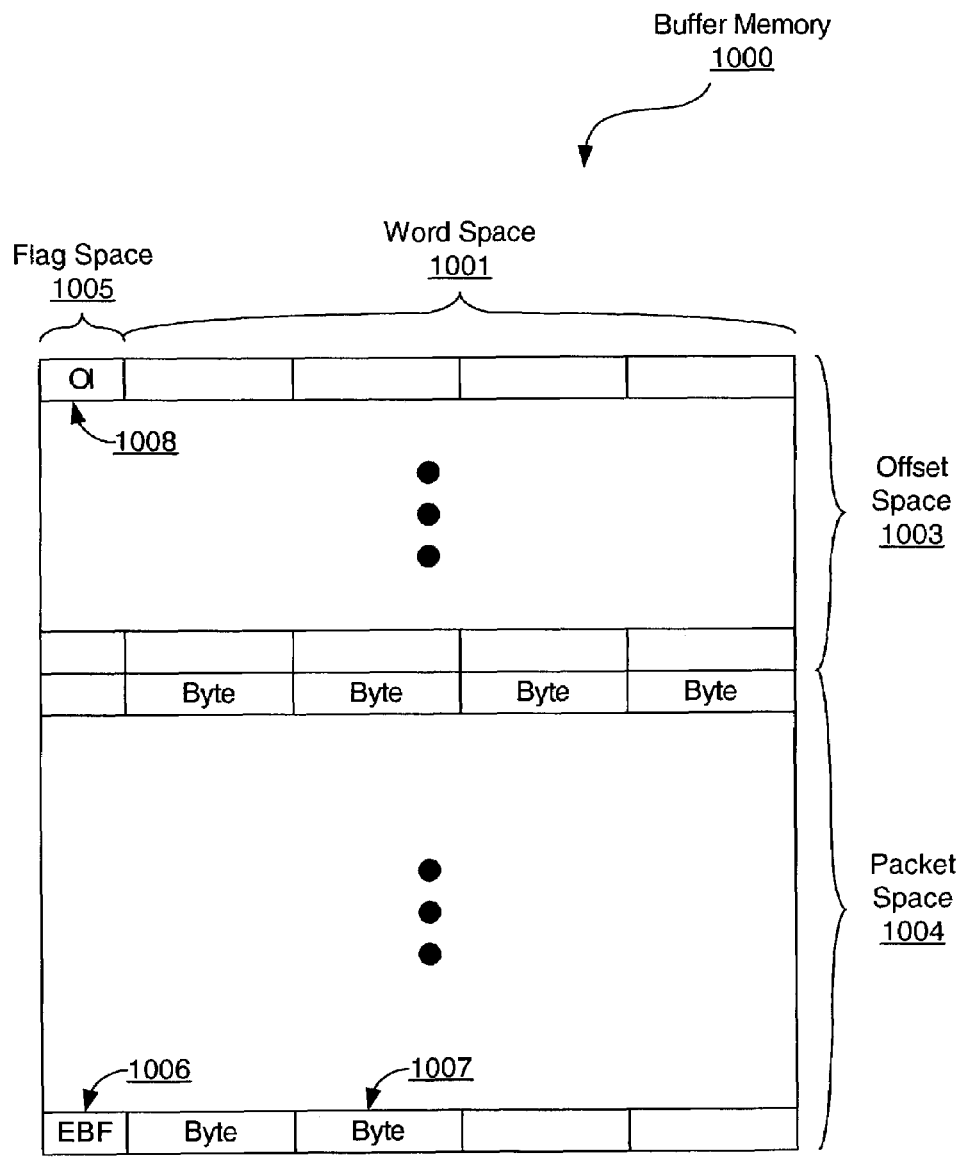
FIG. 10 depicts a block diagram of an exemplary embodiment of a buffer memory.

FIG. 10 is a block diagram of an exemplary embodiment of a buffer memory 1000. For this exemplary embodiment, word space 1001 is presumed to be 32-bits long in four 1-byte increments; however, other word space lengths and increments may be used. As mentioned above, an offset space 1003 for an encapsulation header may be provided to speculate on encapsulation to reduce latency.

After offset space 1003 is packet space 1004, where a packet is stored. Because encapsulation is speculative, it may or may not be present once packet processing is completed. To account for offset, a flag, such as an offset indicator ("OI") 1008, is written to flag space 1005. Flag space 1005 may include one or more registers separate from and in communication with buffer memory 1000, additional word space of buffer memory 1000, or like configuration. For purposes of clarity, it is assumed here that flag space 1005 is additional word space of buffer memory 1000 of at least four bits in length. OI 1008 is written to flag space 1005 associated with a starting location of buffer memory. If OI 1008 indicates 0000, then for example encapsulation was done and thus offset is zero. If, however, OI indicates an offset value, for example 0011, then an offset of five word rows is indicated, such as for speculation of IPv4 encapsulation that never came to fruition. Depth of this offset space 1003 will depend on the type of encapsulation, for example an IPv6 header is longer than an IPv4 header. Accordingly, value of OI 1008 will depend on the type of encapsulation speculated. Flag 1008 may be written to buffer memory by encapsulation thread 603 or IP header recognition thread 604, described above with reference to FIG. 6A.

Notably, where a packet ends within a word varies. Thus, in this example, a packet may end on the first, second, third or fourth byte of a word row. For purposes of description by example, the second byte is selected as an end byte ("EB") 1007. Written to flag space 1005 in association with a final word row used to store a packet is an EB flag ("EBF") 1006. Thus, for this example, EBF 1006 may be 01 to indicate that the second byte of the row is the last byte used to store the packet. EB flag 1006 may be written by main thread 601 to buffer memory of either a designated port or hub, as described with reference to FIG. 6A.

It should be appreciated that OI 1008 and EBF 1006 facilitate initial broadcasting of packets, as described above. Initial broadcasting of packets to all feasible buffers leaves abandoned fragments of packets in all but a selected buffer. As described above, a fragment of a packet may be overwritten by a later arriving packet data stream. However, to ready a packet for immediate transmission, EBF 1006 and OI 1008 are used to know where the packet to be transmitted off-chip starts and ends.

Notably, for clarity multicasting and broadcasting of packets has not been described. However, it will be appreciated by one of ordinary skill that multicasting or broadcasting of a packet from PLD 100 may be used.

It should be appreciated that movement and buffering of packets has been described within an exchange module including mechanisms to support reduction or avoidance of complete copying of packets between buffers at all stages of processing. It should further be appreciated that handling of packets by configured logic within port modules includes the use of multithreading of control flows for such configured logic to reduce latency. Furthermore, because a packet may be completely processed for onward movement by a port prior to receiving the entire contents of such a packet, the packet may be forwarded without delay from a port.

Figure 11:
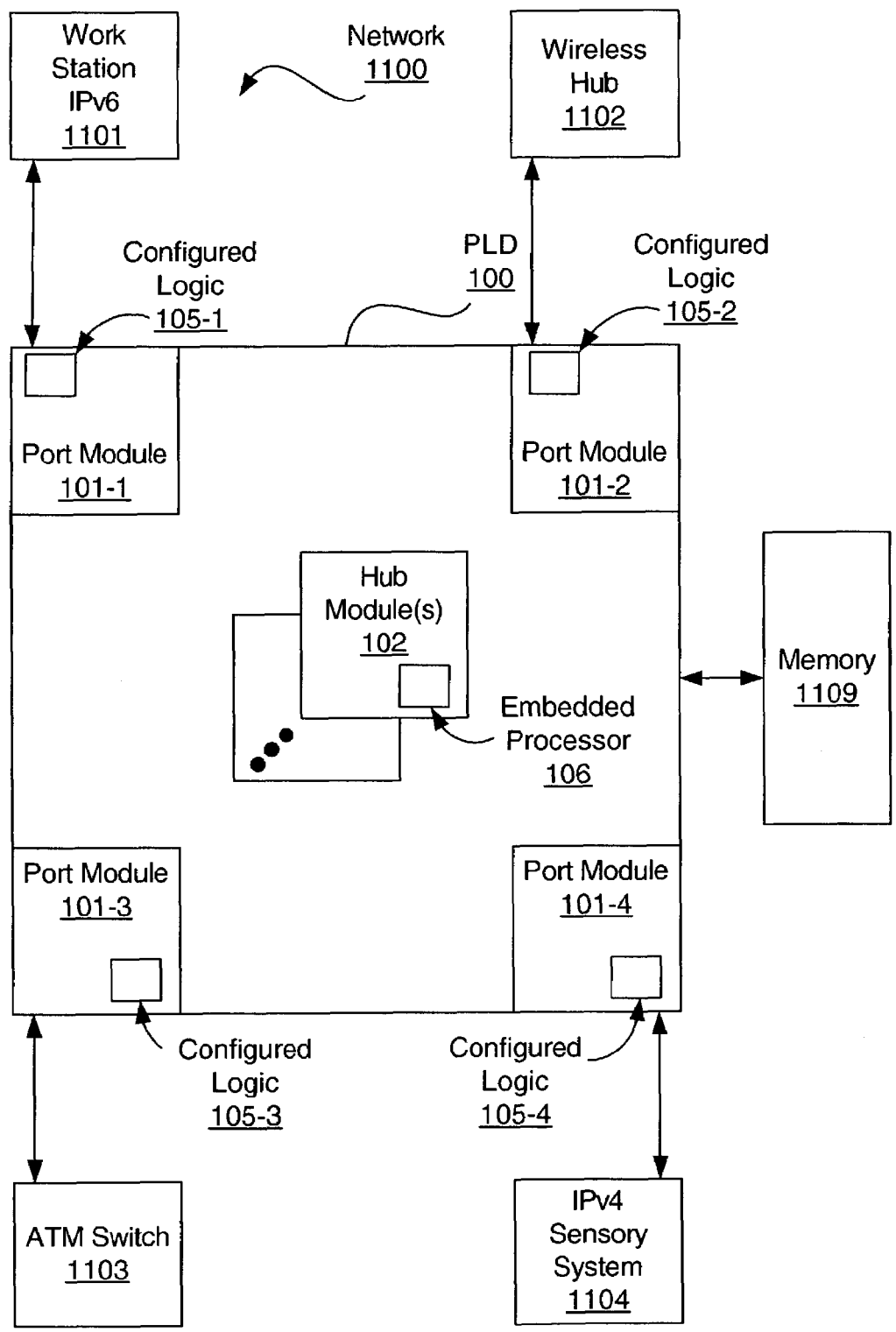
FIG. 11 depicts a block diagram of an exemplary embodiment of a network.

Referring to FIG. 11, there is shown a block diagram of an exemplary embodiment of a network 1100. Network 1100 includes router-PLD 100 in communication with work station 1101 using IPv6, wireless hub 1102 using IEEE 802.11, ATM switch 1103, and a sensory system 1104, such a security system and the like, using IPv4. Optionally, router-PLD 100 may be coupled to external memory for additional capacity for storing programs and communications for operating network 1100. Memory 1109 may include one or more of integrated circuit memory and disk memory. As mentioned above, router-PLD 100 is a reactive system, as it may be adjusted to its environment. Thus, for example, configured logic 105-1 may be configured for communicating with workstation 1101; configured logic 105-2 may be configured for communicating with wireless hub 102; configured logic 105-3 may be configured for communicating with ATM switch 1103; and configured logic 105-4 may be configured for communicating with sensory system 1104. Thus, it should be understood that router-PLD 100 may be configured for adaptation to its environment. Furthermore, program capability using one or more microprocessors 106 allows for interoperability between custom configured ports 101, where configured logic 105 does not have the functional capacity.

Configurable logic facilitates having a mixed-mode router whose functions can evolve, while maintaining performance, with changes whether internal or external to an organization. More particularly, new threads may be instantiated by configuration of circuitry and initialization of state of such configured circuitry. Notably, finite state machines may be partitioned into hardware or software. Where threads execute independently of other threads, their state machine may be clocked as desired. For example, if there are n source threads, each with the same clock frequency but with equally spaced clock phases, recipient threads can operate at n times the frequency of the source threads, where a clock signal is suitably phased with source clock threads. Data selection may be made using a counter to track each clock cycle. Initialization of state and local registers of a thread may be done with respect to a clock signal of that thread. In other words, reset actions may be localized to a thread level. Though multithreading is described, it should be understood that a pipeline architecture may be used. Thus, a SoC may be globally asynchronous, while having pockets of local synchronous operation.

Additionally, it should be appreciated that a processor may be used as a service device to configured logic of ports, especially for remote function calls from such configured logic for lookups. For logic lookups, they may be hardwired, with a lookup table encoded in configurable logic; they may use content-addressable memory; or they may use random-access memory possibly with hashing prior to lookup. Additionally, it should be appreciated that words can be written to and read from buffers on a FIFO basis with not explicit memory addressing by port logic.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method for routing a packet using an entry in an address lookup table, comprising:
    obtaining a router port number from the packet, the router port number corresponding to a single network;
    finding a match in a router port field of the address lookup table to the router port number obtained;
    obtaining a last eight bits of an Internet Protocol version four address from the packet;
    finding a match in a router port interface field of the address lookup table to the last eight bits of the Internet Protocol version four address obtained; and
    obtaining Internet Protocol of a next hop of the packet from an Internet Protocol field for routing.

2. A method for routing a packet using an entry in an address lookup table, comprising:
    obtaining a router port number from the packet, the router port number corresponding to a single network;
    finding a match in a router port field of the address lookup table to the router port number obtained;
    obtaining a last sixty-four bits of an Internet Protocol version six address from the packet;
    selecting a first twenty-four bits and a last twenty-four bits from the last sixty-four bits of the Internet Protocol version six address;
    finding a match in a Media Access Control (MAC) field of the address lookup table to the first twenty-four bits and the last twenty four bits selected as a forty-eight bit MAC address; and
    obtaining Internet Protocol of a next hop of the packet from an Internet Protocol field for routing.

3. A method for routing a packet using an entry in an address lookup table, comprising:
    obtaining a router port number from the packet, the router port number corresponding to a single network;
    finding a match in a router port field of the address lookup table to the router port number obtained;
    for the next hop being an Internet Protocol version four device,
    a. obtaining a last eight bits of an Internet Protocol version four address from the packet;
    b. finding a match in a router port interface field of the address lookup table to the last eight bits of the Internet Protocol version four address obtained;
    for the next hop being an Internet Protocol version six device,
    i. obtaining a last sixty-four bits of an Internet Protocol version six address from the packet;

ii. selecting a first twenty-four bits and a last twenty-four bits from the last sixty-four bits of the Internet Protocol version six address; and iii. finding a match in a Media Access Control (MAC) field of the address lookup table to the first twenty-four bits and the last twenty four bits selected as a forty-eight bit MAC address; and obtaining Internet Protocol of a next hop of the packet from an Internet Protocol field for routing;

wherein bit space for all fields for the address lookup table entry for the packet is less than or equal to sixty-four bits.

4. The method, according to claim 3, further comprising using steps a and b in response to the next hop being capable of handling both Internet Protocol version four and Internet Protocol version six packet types and to the packet being an Internet Protocol version four packet type.

5. The method, according to claim 3, further comprising using steps i, ii and iii in response to the next hop being capable of handling both Internet Protocol version four and Internet Protocol version six packet types and to the packet being an Internet Protocol version six packet type.

* * * * *